(12) United States Patent
Sathi et al.

(10) Patent No.: US 12,190,620 B2
(45) Date of Patent: Jan. 7, 2025

(54) MACHINED LEARNING SUPPORTING DOCUMENT DATA EXTRACTION

(71) Applicant: Automation Anywhere, Inc., San Jose, CA (US)

(72) Inventors: Siddarth Sathi, San Jose, CA (US); Vibhas Gejji, San Jose, CA (US); Anish Hiranandani, San Jose, CA (US); Bruno Gomes Selva, San Jose, CA (US); Anjana Prabhakar, Sunnyvale, CA (US)

(73) Assignee: Automation Anywhere, Inc., San Jose, CA (US)

( * ) Notice: Subject to any disclaimer, the term of this patent is extended or adjusted under 35 U.S.C. 154(b) by 366 days.

(21) Appl. No.: 17/160,082

(22) Filed: Jan. 27, 2021

(65) Prior Publication Data

US 2022/0108106 A1     Apr. 7, 2022

Related U.S. Application Data

(60) Provisional application No. 63/087,851, filed on Oct. 5, 2020, provisional application No. 63/087,847, filed
(Continued)

(51) Int. Cl.
*G06V 30/416*     (2022.01)
*G06F 16/242*     (2019.01)
(Continued)

(52) U.S. Cl.
CPC .......... *G06V 30/416* (2022.01); *G06F 16/243* (2019.01); *G06F 40/00* (2020.01);
(Continued)

(58) Field of Classification Search
CPC .... G06V 30/416; G06V 30/00; G06V 30/153; G06V 30/19173; G06V 30/40;
(Continued)

(56) References Cited

U.S. PATENT DOCUMENTS 5,949,999 A    9/1999  Song et al.
5,983,001 A    11/1999 Boughner et al.
(Continued)

FOREIGN PATENT DOCUMENTS

WO    2019/092672 A2    5/2019
WO    WO 2022/076488    4/2022

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).
(Continued)

*Primary Examiner* — Akwasi M Sarpong
*Assistant Examiner* — Michael L Burleson

(57) ABSTRACT

Improved techniques to access content from documents in an automated fashion. The improved techniques permit content within documents to be retrieved and then used by computer systems operating various software programs (e.g., application programs), such as an extraction program. Documents, especially business transaction documents, often have various descriptors (or tables) and values that form key-value pairs. The improved techniques permit key-value pairs within documents to be recognized and extracted from documents. Consequently, RPA systems are able to accurately understand the content of tables within documents so that users and/or software robots can operate on the documents with increased reliability and flexibility.

26 Claims, 17 Drawing Sheets

Related U.S. Application Data on Oct. 5, 2020, provisional application No. 63/087,844, filed on Oct. 5, 2020.

(51) Int. Cl.
| | |
|---|---|
| *G06F 40/00* | (2020.01) |
| *G06F 40/177* | (2020.01) |
| *G06F 40/20* | (2020.01) |
| *G06F 40/279* | (2020.01) |
| *G06N 3/045* | (2023.01) |
| *G06N 20/00* | (2019.01) |
| *G06Q 10/10* | (2023.01) |
| *G06Q 40/12* | (2023.01) |
| *G06V 30/00* | (2022.01) |
| *G06V 30/148* | (2022.01) |
| *G06V 30/19* | (2022.01) |
| *G06V 30/40* | (2022.01) |
| *G06V 30/412* | (2022.01) |
| *G06V 30/413* | (2022.01) |
| *G06V 30/414* | (2022.01) |

(52) U.S. Cl.
CPC ............ *G06F 40/177* (2020.01); *G06F 40/20* (2020.01); *G06F 40/279* (2020.01); *G06N 3/045* (2023.01); *G06N 20/00* (2019.01); *G06Q 10/10* (2013.01); *G06Q 40/12* (2013.12); *G06V 30/00* (2022.01); *G06V 30/153* (2022.01); *G06V 30/19173* (2022.01); *G06V 30/40* (2022.01); *G06V 30/412* (2022.01); *G06V 30/413* (2022.01); *G06V 30/414* (2022.01)

(58) Field of Classification Search
CPC .. G06V 30/412; G06V 30/413; G06V 30/414; G06F 40/00; G06F 40/177; G06F 40/20; G06F 40/279; G06N 3/045; G06N 3/044; G06Q 10/10

See application file for complete search history.

(56) References Cited

U.S. PATENT DOCUMENTS

| | | |
|---|---|---|
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,783,135 B2 | 8/2010 | Gokturk |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Fotev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 8,966,458 B2 | 2/2015 | Asai |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,251,413 B2 | 2/2016 | Meler |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,934,063 B2 | 4/2018 | Kania |
| 9,934,129 B2 | 4/2018 | Budurean |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,592,738 B2 | 3/2020 | Northrup |
| 10,654,166 B2 | 5/2020 | Hall |
| 10,706,218 B2 | 7/2020 | Milward et al. |
| 10,706,228 B2 | 7/2020 | Buisson |
| 10,713,068 B1 | 7/2020 | Zohar |
| 10,936,807 B1 | 3/2021 | Walters |
| 11,099,972 B2 | 8/2021 | Puszkiewicz |
| 11,176,443 B1 | 11/2021 | Selva |
| 11,182,178 B1 | 11/2021 | Singh et al. |
| 11,182,604 B1 | 11/2021 | Methaniya |
| 11,243,803 B2 | 2/2022 | Anand et al. |
| 11,263,391 B2 | 3/2022 | Potts |
| 11,348,353 B2 | 5/2022 | Sundell et al. |
| 11,614,731 B2 | 3/2023 | Anand et al. |
| 11,775,321 B2 | 10/2023 | Singh et al. |
| 11,775,339 B2 | 10/2023 | Anand et al. |
| 11,775,814 B1 | 10/2023 | Anand et al. |
| 11,782,734 B2 | 10/2023 | Ginoya et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0110382 A1 | 6/2003 | Leporini |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0089101 A1 | 4/2007 | Romanovskiy |
| 2007/0101291 A1 | 5/2007 | Forstall et al. |

(56) References Cited

U.S. PATENT DOCUMENTS

| | | |
|---|---|---|
| 2007/0112574 A1 | 5/2007 | Greene |
| 2007/0156677 A1 | 7/2007 | Szabo |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0310625 A1 | 12/2008 | Vanstone et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2010/0275113 A1 | 10/2010 | Bastos Dos Santos |
| 2011/0022578 A1 | 1/2011 | Fotev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258550 A1 | 10/2011 | Dinh-Trong |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Greene |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0332511 A1 | 12/2013 | Hala |
| 2013/0332524 A1 | 12/2013 | Fiala |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0379666 A1 | 12/2014 | Bryon |
| 2015/0082280 A1 | 3/2015 | Betak et al. |
| 2015/0235193 A1 | 8/2015 | Cummings |
| 2015/0301926 A1 | 10/2015 | Giannelos |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0091615 A1* | 3/2017 | Liu ........................ G06N 3/044 |
| 2017/0270431 A1 | 9/2017 | Hosabettu |
| 2018/0113781 A1 | 4/2018 | Kim |
| 2018/0210824 A1 | 7/2018 | Kochura |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0349730 A1 | 12/2018 | Dixon |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0095440 A1 | 3/2019 | Chakra |
| 2019/0114370 A1 | 4/2019 | Cerino |
| 2019/0126463 A1 | 5/2019 | Purushothaman |
| 2019/0141596 A1 | 5/2019 | Gay |
| 2019/0188462 A1 | 6/2019 | Nishida |
| 2019/0205636 A1* | 7/2019 | Saraswat .............. G06V 30/412 |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0065384 A1* | 2/2020 | Costello .................. G06N 3/04 |
| 2020/0097742 A1 | 3/2020 | Kumar et al. |
| 2020/0104350 A1 | 4/2020 | Allen |
| 2020/0125635 A1* | 4/2020 | Nuolf ..................... G06N 20/20 |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0249964 A1 | 8/2020 | Fernandes |
| 2020/0273078 A1* | 8/2020 | Xu ........................ G06Q 30/04 |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2020/0364291 A1* | 11/2020 | Bentabet ............... G06F 40/258 |
| 2021/0049128 A1 | 2/2021 | Kernick |
| 2021/0107140 A1 | 4/2021 | Singh |
| 2021/0141497 A1 | 5/2021 | Magureanu |
| 2021/0216334 A1 | 7/2021 | Barrett |
| 2021/0279166 A1 | 9/2021 | Peng |
| 2021/0391004 A1* | 12/2021 | Yudanov ............. G06F 16/2468 |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deplying and managing Web services: issues, solutions, and directions, 36 pages (Year: 2008).

Zhifang et al., Test automation on moble device, May 2010, 7 pages.

Non-Final Office Action for U.S. Appl. No. 17/230,492, mailed Oct. 14, 2022.

Notice of Allowance for U.S. Appl. No. 16/398,532, mailed Oct. 23, 2022.

Non-Final Office Action for U.S. Appl. No. 16/876,530, mailed Sep. 29, 2020.

(56) References Cited

OTHER PUBLICATIONS

Final Office Action for U.S. Appl. No. 16/876,530, mailed Apr. 13, 2021.
Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
Dai, Jifeng et al., "R-fcn: Object detection via region-based fully convolutional networks", Advances in neural information processing systems 29 (2016). (Year: 2016).
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Luqman, et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Final Office Action for U.S. Appl. No. 17/139,842, mailed Dec. 29, 2023.
Notice of Allowance for U.S. Appl. No. 18/126,935, mailed Jan. 10, 2024.
Notice of Allowance for U.S. Appl. No. 17/463,494, mailed Jan. 16, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.

* cited by examiner

MACHINED LEARNING SUPPORTING DOCUMENT DATA EXTRACTION

CROSS-REFERENCE TO RELATED APPLICATIONS

This application claims priority to: (i) U.S. Patent Provisional Application No. 63/087,847, filed Oct. 5, 2020, and entitled "MACHINED LEARNING SUPPORTING DOCUMENT DATA EXTRACTION," which is hereby incorporated herein by reference; (ii) U.S. Patent Provisional Application No. 63/087,851, filed Oct. 5, 2020, and entitled "METHOD AND SYSTEM FOR EXTRACTION OF DATA FROM DOCUMENTS FOR ROBOTIC PROCESS AUTOMATION," which is hereby incorporated herein by reference; and (iii) U.S. Patent Provisional Application No. 63/087,844, filed Oct. 5, 2020, and entitled "METHOD AND SYSTEM FOR EXTRACTION OF TABLE DATA FROM DOCUMENTS FOR ROBOTIC PROCESS AUTOMATION," which is hereby incorporated herein by reference.

This application is related to: (i) U.S. patent application Ser. No. 17/160,080, filed Jan. 27, 2021, and entitled "METHOD AND SYSTEM FOR EXTRACTION OF DATA FROM DOCUMENTS FOR ROBOTIC PROCESS AUTOMATION," which is hereby incorporated herein by reference; and (ii) U.S. patent application Ser. No. 17/160,084, filed Jan. 27, 2021, and entitled "METHOD AND SYSTEM FOR EXTRACTION OF TABLE DATA FROM DOCUMENTS FOR ROBOTIC PROCESS AUTOMATION," which is hereby incorporated herein by reference.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

In the case of documents that are to be accessed and processed by one or more software applications being used by software agents, the documents can be analyzed from images of the documents. The document image can contain text which can be obtained by Optical Character Recognition (OCR) processing. While OCR processing of documents can recognize text contained therein, such process is not well suited to capture data from tables contained in the documents, such as invoices, purchase orders, or more generally tables, nor is such process well suited to capture values and associated descriptive labels contained in the documents.

Therefore, there is a need for improved approaches to understand and extract data provided within documents such that RPA systems are able to accurately understand the content of the documents so that software robots can operate on the documents with increased reliability and flexibility.

SUMMARY

Embodiments disclosed herein can concern improved techniques to access content from documents in an automated fashion. The improved techniques permit content within documents to be retrieved and then used by computer systems operating various software programs (e.g., application programs), such as an extraction program. Documents, especially business transaction documents, often have various descriptors (or tables) and values that form key-value pairs. The improved techniques permit key-value pairs within documents to be recognized and extracted from documents. The documents being received and processed can be electronic images of documents. As an example, the documents can be business transaction documents which include one or more key-value pairs such as for date, quantity, price, part number, account number, etc. Consequently, RPA systems are able to accurately understand the content within documents so that users, application programs and/or software robots can operate on the documents with increased reliability and flexibility. The documents being received and processed can be electronic images of documents.

The invention can be implemented in numerous ways, including as a method, system, device, apparatus (including computer readable medium and graphical user interface). Several embodiments of the invention are discussed below.

As a computer-implemented method for extracting data an image of a document, one embodiment can, for example, include at least: retrieving object data pertaining to an object that has been detected in the image of the document, the object data denoting at least a portion of the document having the object; acquiring text pertaining to the portion of the document having the object, the text having been recognized from the image of the document; determining a key type for the object based on the text and a machine learned model; determining a value for the object based on the determined key type for the object; and storing the determined key type and the determined value for the object.

As a data extraction system for extracting data from an image of a document, one embodiment can, for example, include the data extraction system comprising: a character level neural network model that receives an object block and recognized text within at least a portion of the document as recognized from the image of the document, the character level neural network model predicting a key type and a value for the object block; and a pattern matching model that receives an object block and recognized text within at least a portion of the document as recognized from the image of the document, the pattern matching model predicting a key type and a value for the object block.

As a non-transitory computer readable medium including at least computer program code tangible stored thereon for extracting data an image of a document, one embodiment can, for example, include at least: computer program code for retrieving object data pertaining to an object that has been detected in the image of the document, the object data denoting at least a portion of the document having the object; computer program code for acquiring text pertaining to the portion of the document having the object, the text having been recognized from the image of the document; computer program code for determining a key type for the object based on at least the text; computer program code for determining a value for the object based on the determined key type for the object; and computer program code for storing the determined key type and the determined value for the object.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1:
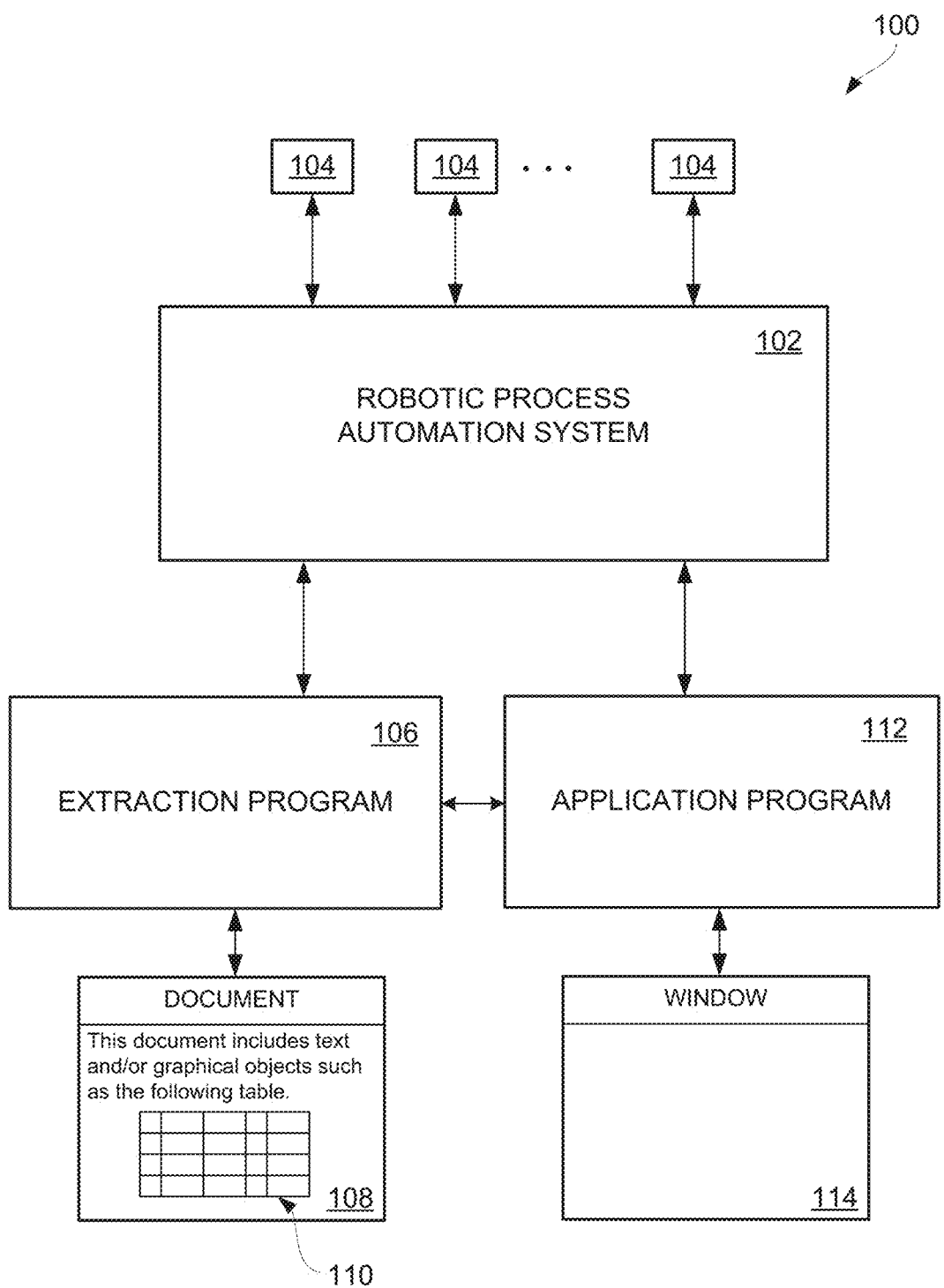
FIG. 1 is a block diagram of a programmatic automation environment according to one embodiment.

Embodiments disclosed herein can concern improved techniques to access content from documents in an automated fashion. The improved techniques permit content within documents to be retrieved and then used by computer systems operating various software programs (e.g., application programs), such as an extraction program. Documents, especially business transaction documents, often have various descriptors (or tables) and values that form key-value pairs. The improved techniques permit key-value pairs within documents to be recognized and extracted from documents. The documents being received and processed can be electronic images of documents. As an example, the documents can be business transaction documents which include one or more key-value pairs such as for date, quantity, price, part number, account number, etc. Consequently, RPA systems are able to accurately understand the content within documents so that users, application programs and/or software robots can operate on the documents with increased reliability and flexibility. The documents being received and processed can be electronic images of documents.

Embodiments disclosed herein can provide for extraction of data from documents, namely, images of documents. The extraction processing can be hierarchical, such as being performed in multiple levels (i.e., multi-leveled). At an upper level, numerous different objects within a document can be detected along with positional data for the objects and can be categorized based on a type of object. Then, at lower levels, the different objects can be processed differently depending on the type of object. As a result, data extraction from the document can be performed with greater reliability and precision.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes. The RPA systems also provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow that they are tasked with once or many times. As one example, a software automation process can locate and read data in a document, email, file, or other data source. As another example, a software automation process can connect with one or more Enterprise Resource Planning (ERP), Customer Relations Management (CRM), core banking, or other business systems to distribute data where it needs to be in whatever format is necessary. As another example, a software automation process can perform data tasks, such as reformatting, extracting, balancing, error checking, moving, copying, etc. As another example, a software automation process can retrieve data from a webpage, application, screen, or window. As still another example, a software automation process can be trigger based on time or an event, and can serve to take files or data sets and move them to another location, whether it is to a customer, vendor, application, department or storage. These various capabilities can also be used in any combination. As an example of an integrated software automation process, the software automation process can start a task or workflow based on a trigger, such as a file being uploaded to an FTP system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-11. However, those skilled in the art will readily appreciate that the detailed description given herein with respect to these figures is for explanatory purposes as the invention extends beyond these limited embodiments.

FIG. 1 is a block diagram of a programmatic automation environment 100 according to one embodiment. The programmatic automation environment 100 is a computing environment that supports robotic process automation. The computing environment can include or make use of one or more computing devices. Each of the computing devices can, for example, an electronic device having computing capabilities, such as a mobile phone (e.g., smart phone), tablet computer, desktop computer, portable computer, server computer, and the like.

The programmatic automation environment 100 includes a robotic process automation system 102 that provides the robotic process automation. The robotic process automation system 102 supports a plurality of different robotic processes, which are denoted software automation processes 104. These software automation processes 104 can also be referred to as "software robots," "bots" or "software bots." The robotic process automation system 102 can create, maintain, execute, and/or monitor software automation processes 104. The robotic process automation system 102 can also report status or results of software automation processes 104.

On execution of one or more of the software automation processes 104, the software automation processes 104, via robotic process automation system 102, can interact with one or more software programs. One such software program is an extraction program 106. The extraction program 106, when operating, typically interacts with one or more documents 108. In some cases, the extraction program 106 is seeking to access documents 108 that contain data that is to be extracted and then suitably processed. The documents 108 are typically digital images of documents, and such documents can include text and graphical objects, such one or more tables. The RPA system 102 can include sophisticated processing and structures to support the extraction of data from such document images, and in particular extraction of data from tables within the documents. Examples of documents 108 including tables are invoices, purchase orders, delivery receipts, bill of lading, etc.

When robotic process automation operations are being performed, the robotic process automation system 102 seeks to interact with the extraction program 106. However, since the robotic process automation system 102 is not integrated with the extraction program 106, the robotic process automation system 102 requires an ability to understand what content is contained in the document 108. For example, the content being presented in the extraction window 108 can pertain to a document, which can include a table 110 within the document. In this regard, the robotic process automation system 102 interacts with the extraction program 106 by interacting with the content in the document 108. By doing so, the software automation process 104 being carried out via the robotic process automation system 102 can effectively interface with the document 108 as would a user, even though no user is involved because the actions by the software automation process 104 are programmatically performed. Once the content of the document is captured and understood, the robotic process automation system 102 can perform an action requested by the software automation process 104 by inducing action with respect to the application program 106.

When robotic process automation operations are being performed, the robotic process automation system 102 seeks to interact with the application program 112. However, since the robotic process automation system 102 is not integrated with the application program 112, the robotic process automation system 102 requires an ability to understand what content is being presented in the application window 114. For example, the content being presented in the application window 114 can pertain to a document, which can include a table 110 within the document 108. In this regard, the robotic process automation system 102 interacts with the application program 112 by interacting with the content in the application window 114 corresponding to the application program 112. The content can pertain to a document being displayed in the application window. By doing so, the software automation process 104 being carried out via the robotic process automation system 102 can effectively interface with the document being displayed in the application window 114 as would a user, even though no user is involved because the actions by the software automation process 104 are programmatically performed.

In one embodiment, the application program 112 can host the extraction program 106. In such case, the robotics process automation system 102 can interact with the application program 112 to carry out the software automation process 104, and the application program 112 can interact with the extraction program 106 as needed.

Figure 2:
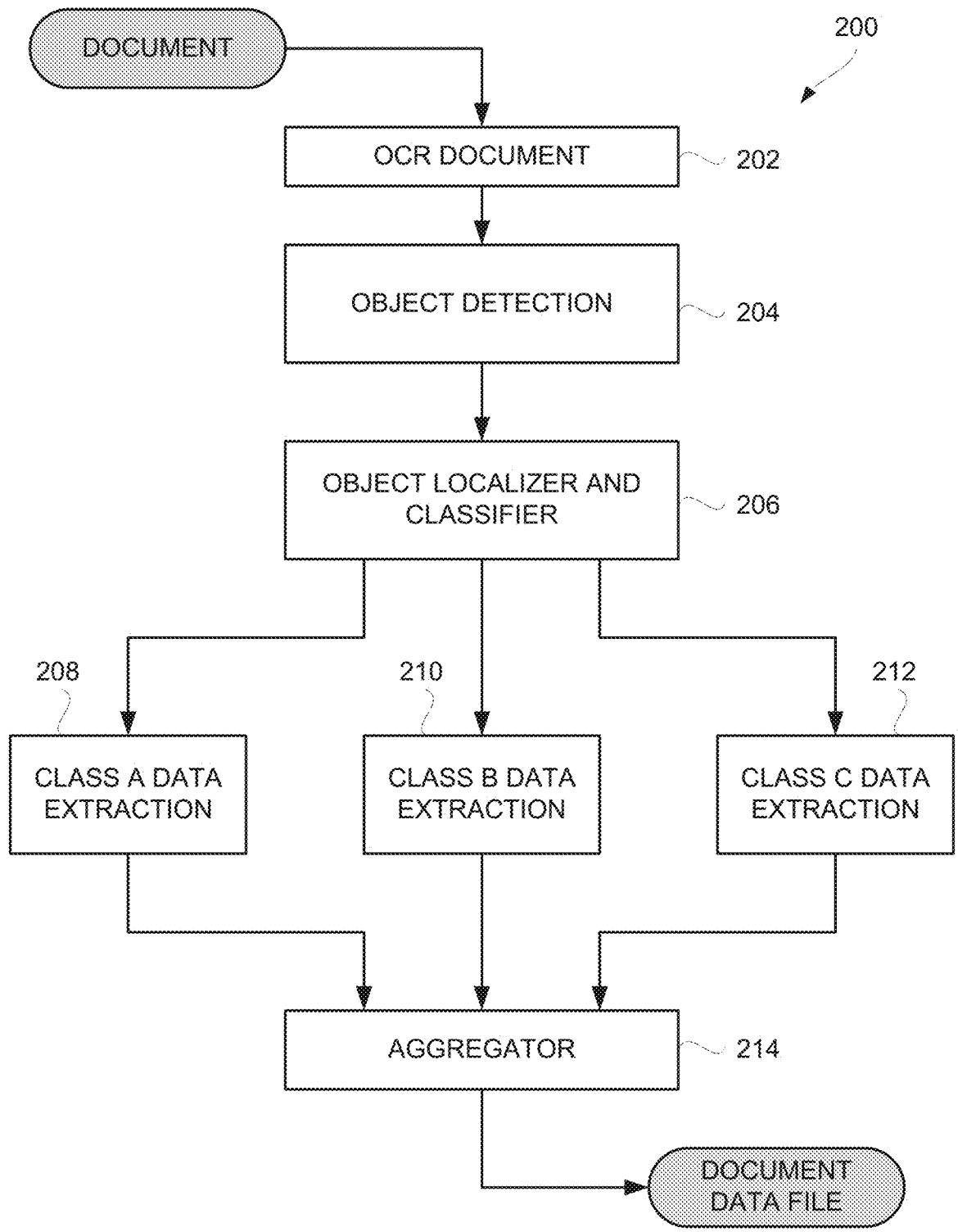
FIG. 2 is a block diagram of data extraction system according to one embodiment.

FIG. 2 is a block diagram of data extraction system 200 according to one embodiment. The data extraction system 200 receives a document to be processed. The document to be processed is an electronic document, such as an image (PNG, JPEG, etc.) or Portable Document Format (PDF). The document can then be processed to recognize the text within the document such as through use of Optical Character Recognition (OCR) 202. Next, the document can undergo object detection 204. The object detection 204 serves to identify various objects within the document as well as identifying the different classes or types of those objects that have been identified within the document. An object localizer and classifier 206 can then be used to further process the identified objects depending upon their classification (or type).

In this particular embodiment illustrated in FIG. 2, the object localizer and classifier 206 serves to classify the detected objects into three distinct classes, that is, class A, class B and class C. The detected objects that are classified as class A objects are directed by the object localizer and classifier 206 to class A data extraction 208 where data can be extracted from the class A objects. The detected objects that are classified as class B objects can be directed by the object localizer and classifier 206 to class B data extraction 210 where data can be extracted from the class B objects. The detected objects that are classified as class C objects can be directed by the object localizer and classifier 206 to class C data extraction 212 where data can be extracted from the class C objects. In this regard, different data extraction processing can be provided for different types of objects. As a result, more robust and efficient data extraction is able to be provided separately for different type of objects.

Additionally, the data extraction system 200 includes an aggregator 214. The aggregator 214 is coupled to the class A data extraction 208, the class B data extraction 210 and the class C data extraction 212 such that the extracted data from the various objects (or blocks) of the document can be aggregated together to form a document data file that is produced by the data extraction system 200 and contains all the extracted data for the document.

The classes used by the object localizer and classifier 206 can vary with implementation. These classes are also referred to as blocks or object blocks. Some exemplary classes for documents include the following: key-value block, key info block, table block, graphic block, etc.

Figure 3A:
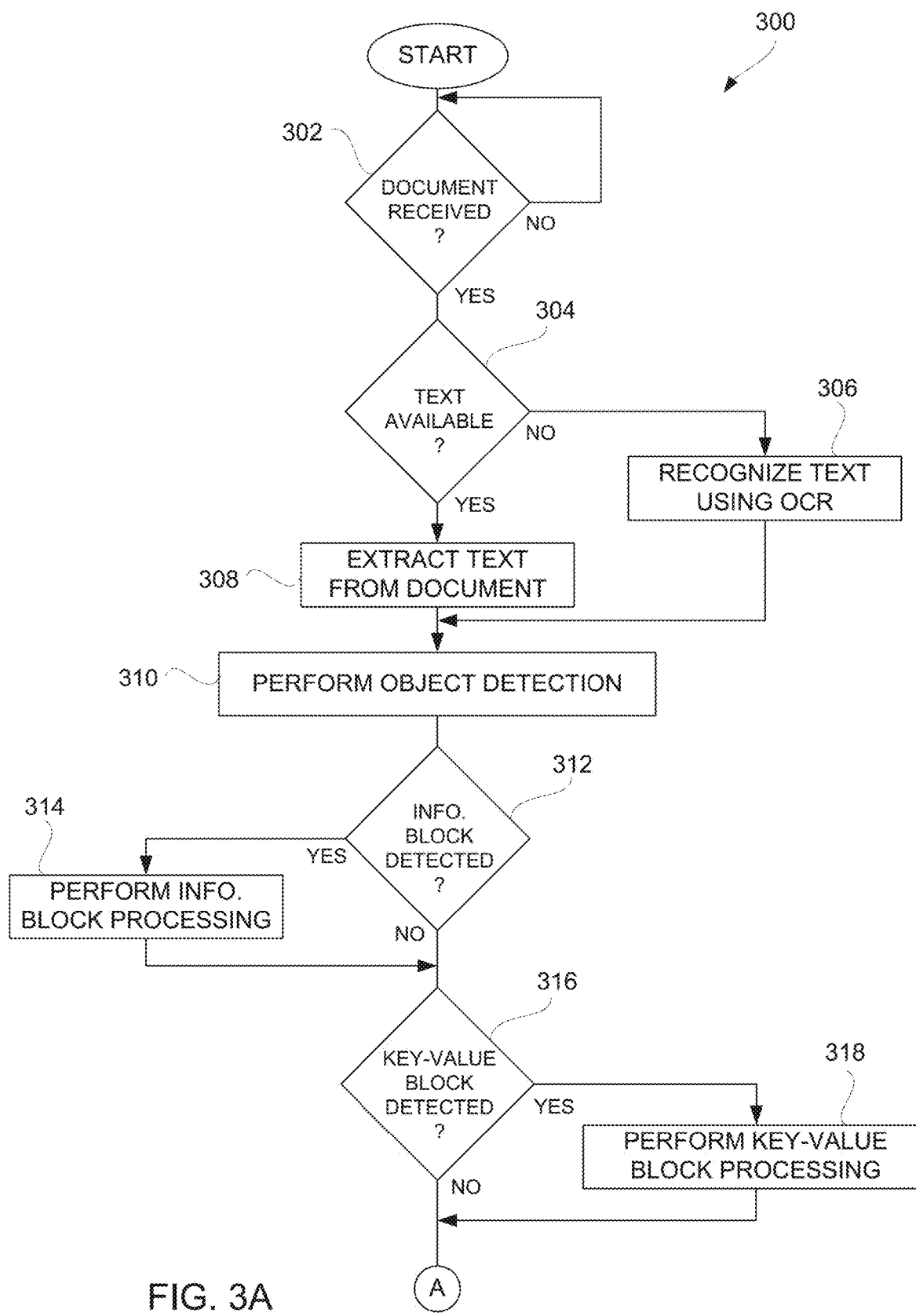
FIGS. 3A and 3B are flow diagrams of a data extraction process according to one embodiment.
Figure 3B:
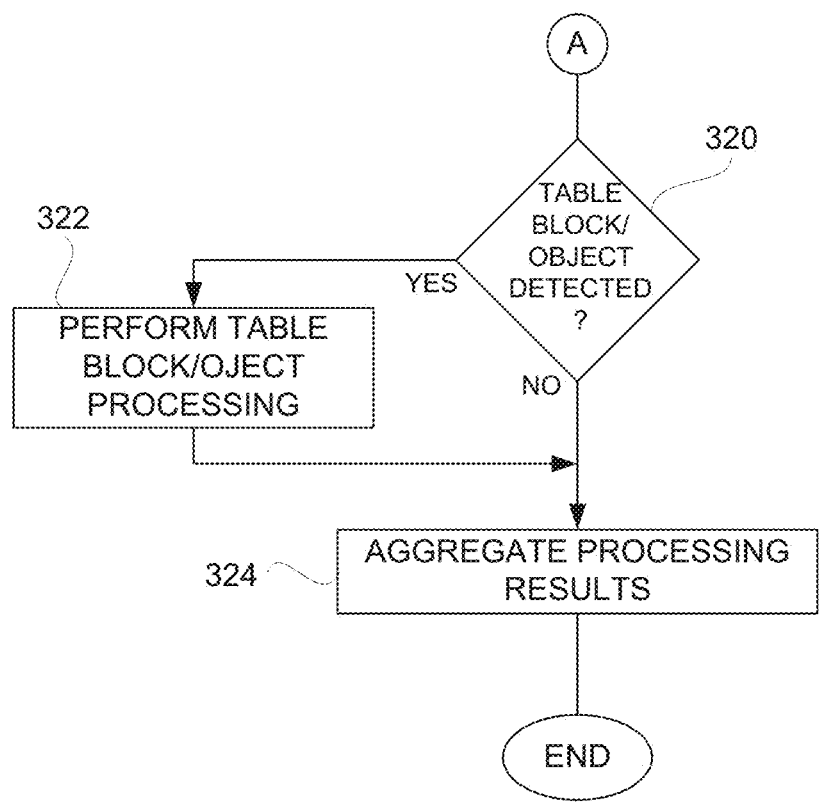

FIGS. 3A and 3B are flow diagrams of a data extraction process 300 according to one embodiment. The data extraction process 300 can, for example, be performed by an extraction program, such as the extraction program 106.

The data extraction process 300 can begin with a decision 302 that determines whether a document has been received. When the decision 302 determines that a document has not yet been received, the data extraction process 300 can await receipt of such a document. Once the decision 302 determines that a document has been received, a decision 304 can determine whether text is available from the document. For example, if the document is provided as an image, then the text would not be directly available. On the other hand, if the document is a vector-based PDF document, the text would normally be available. When the decision 304 determines that text is available from the document, then the text is extracted 308 from the document. Alternatively, when the decision 304 determines that text is not available from the document, the text within the document can be recognized 306 using OCR. When the decision 304 determines that text is not available from the document, the text within the document can be recognized 306 using OCR. Alternatively, when the decision 304 determines that text is available from the document, then the text is extracted 308 from the document.

Following block 308 or block 306 after the text within the document has been obtained, object detection can be performed 310. The object detection seeks to detect these one or more objects within the document. In this embodiment, the objects that can be detected include an information block, a key-value block, and a table block. However, the invention is not limited to detection of these particular types of objects.

After the object detection has been performed, a decision 312 can determine whether an information block has been detected within the document. When the decision 312 determines that an information block has been detected, then information block processing can be performed 314. After the information block processing has been performed 314, or directly after the decision 312 when no information block has been detected, a decision 316 can determine whether a key-value block has been detected. When the decision 316 determines that a key-value block has been detected, key-value block processing can be performed 318. After the key-value block processing has been performed 318, or directly following the decision 316 when a key-value block is not been detected, a decision 320 can determine whether a table block/object has been detected. When the decision 320 determines that a table block/object has been detected, table block/object processing can be performed 322. Here, when the document includes a table, there is a table block and associated table objects. The table block/object processing can process these components of the table. After the table block/object processing has been performed 322, or directly following the decision 320 when the table block/object is not been detected, the data extraction process can aggregate 324 processing results. Here, to the extent that the object detection has detected one or more information blocks, key-value blocks and/or table blocks/objects, the results from the processing thereof can be aggregated 324. The result of the aggregation 324 can be provided in a document data file. Following the aggregation 324, the data within the table provided in the document has been extracted and thus the data extraction and process 300 can end.

Figure 4A:
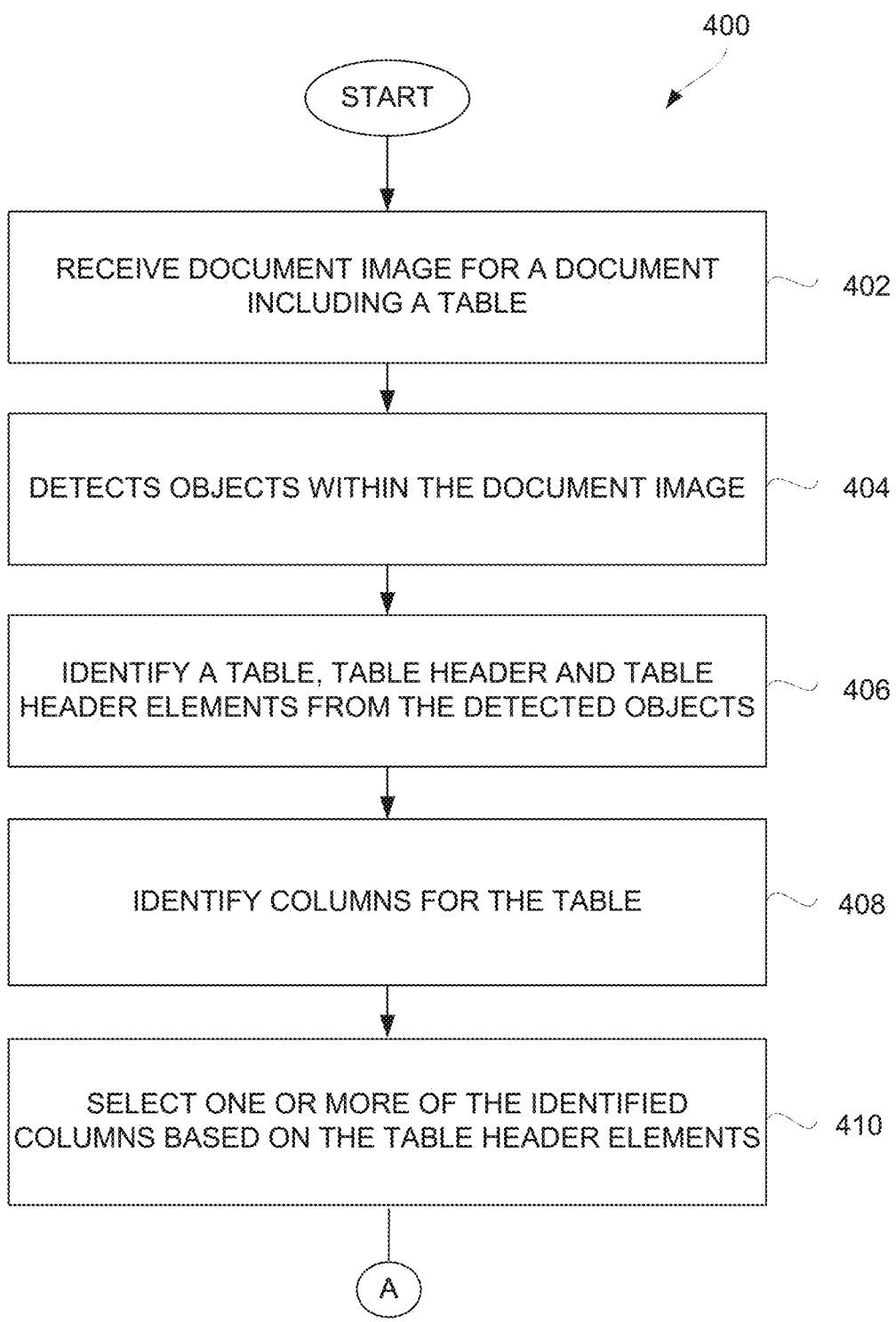
FIGS. 4A and 4B are flow diagrams of a table data extraction process according to another embodiment.
Figure 4B:
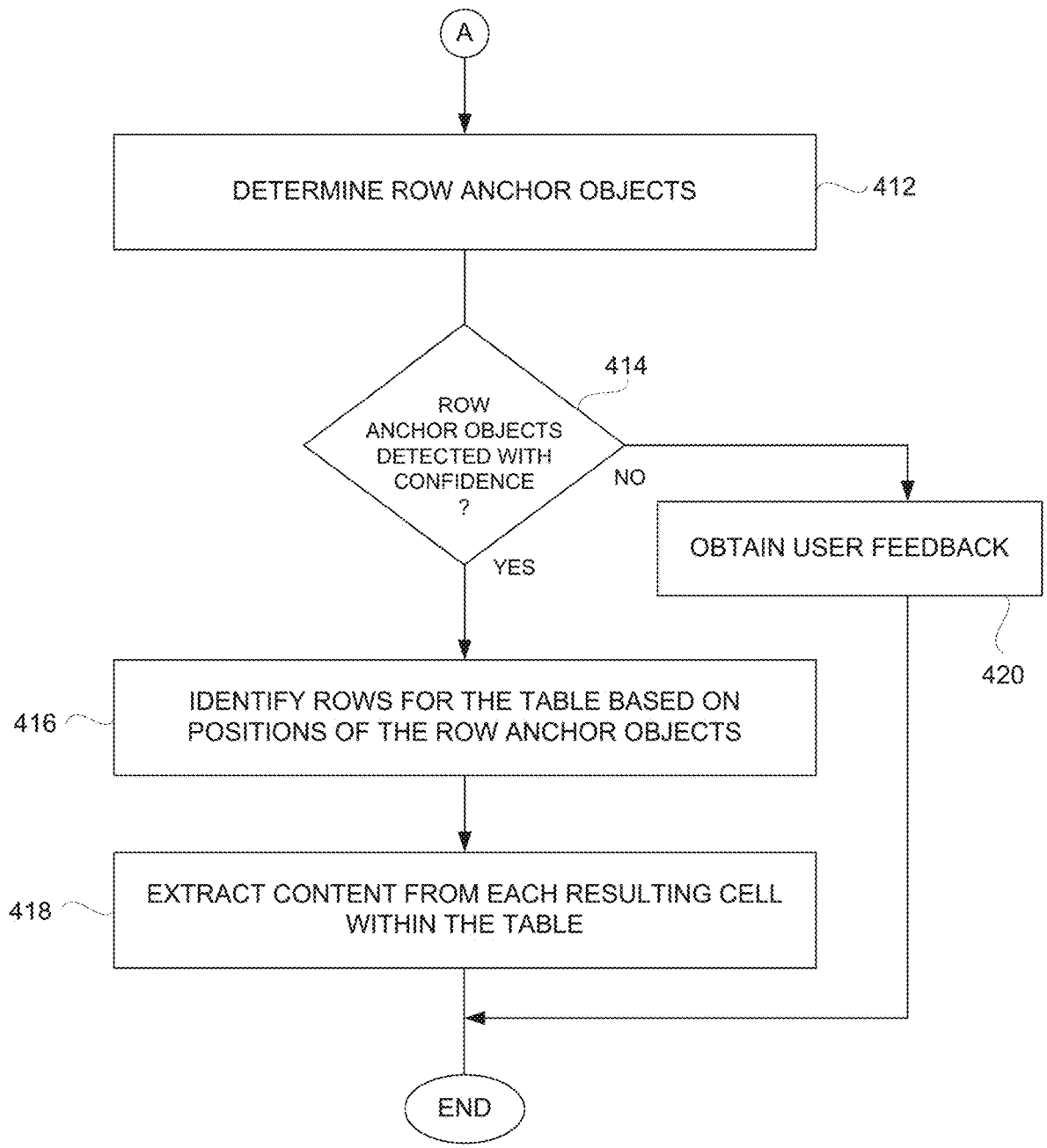

FIGS. 4A and 4B are flow diagrams of a table data extraction process 400 according to another embodiment. The table data extraction process 400 can, for example, be performed by an extraction program, such as the extraction program 106 illustrated in FIG. 1.

The table data extraction process 400 receives 402 into a document image for a document that includes a table. Next, the document image can be processed to detect 404 objects within the document image. After the objects have been detected 404, a table, a table header and table header elements can be identified 406 from the detected objects. Next, columns for the table can be identified 408 using at least one or more of the objects that have been detected 404.

Thereafter, one or more of the identified columns can be selected 410 based on the table header elements. Next, row anchor objects can be determined 412. Row anchor objects are typically text, such as words or labels, or values that can be used to signal location of rows of the table. Then, a decision 414 can determine whether row anchor objects have been detected with confidence. When the decision 414 determines that row anchor objects have been detected with confidence, rows for the table can be identified 416 based on positions of the row anchor objects. Then, content can be extracted 418 from each resulting cell within the table. The cells are defined by the intersection of columns and rows. Following the block 418, since the columns and rows of the table were detected and content from its resulting cells has been extracted, the table data extraction process 400 can end. Alternatively, if the decision 414 determines that the row anchor objects have not been detected with confidence, the user feedback can be obtained 420 to assist with extraction of content from the table within the document.

FIG. 5A-5D are flow diagrams of a table data extraction process 500 according to still another embodiment. The table data extraction process 500 can, for example, be performed by an extraction program, such as the extraction program 106 illustrated in FIG. 1.

The table data extraction process 500 receives 502 into a document image for a document that includes a table. Next, the document image can be processed to detect 504 objects within the document image. After the objects have been detected 504, a table, a table header and table header elements can be identified 506 from the detected objects. Next, columns for the table can be identified 508 using at least one or more of the objects that have been detected 504.

Thereafter, one or more of the identified columns can be selected 510 based on the table header elements. Next, a decision 512 determines whether the selected table header element is approximately pertaining to a quantity. Here, the selected table header element can be "quantity" or an alias therefor, such as "amount." When the decision 512 determines that the selected table header element is corresponding to a quantity, then word blocks in the column associated with the quantity column can be identified 514. Next, rows for the table can be identified 516 based on positions of the identified word blocks. After the rows for the table have been identified 516, the table data extraction process 500 can proceed to extract 518 content from each resulting cell within the table. The cells of the table are defined by the intersection of columns and rows.

Figure 5A:
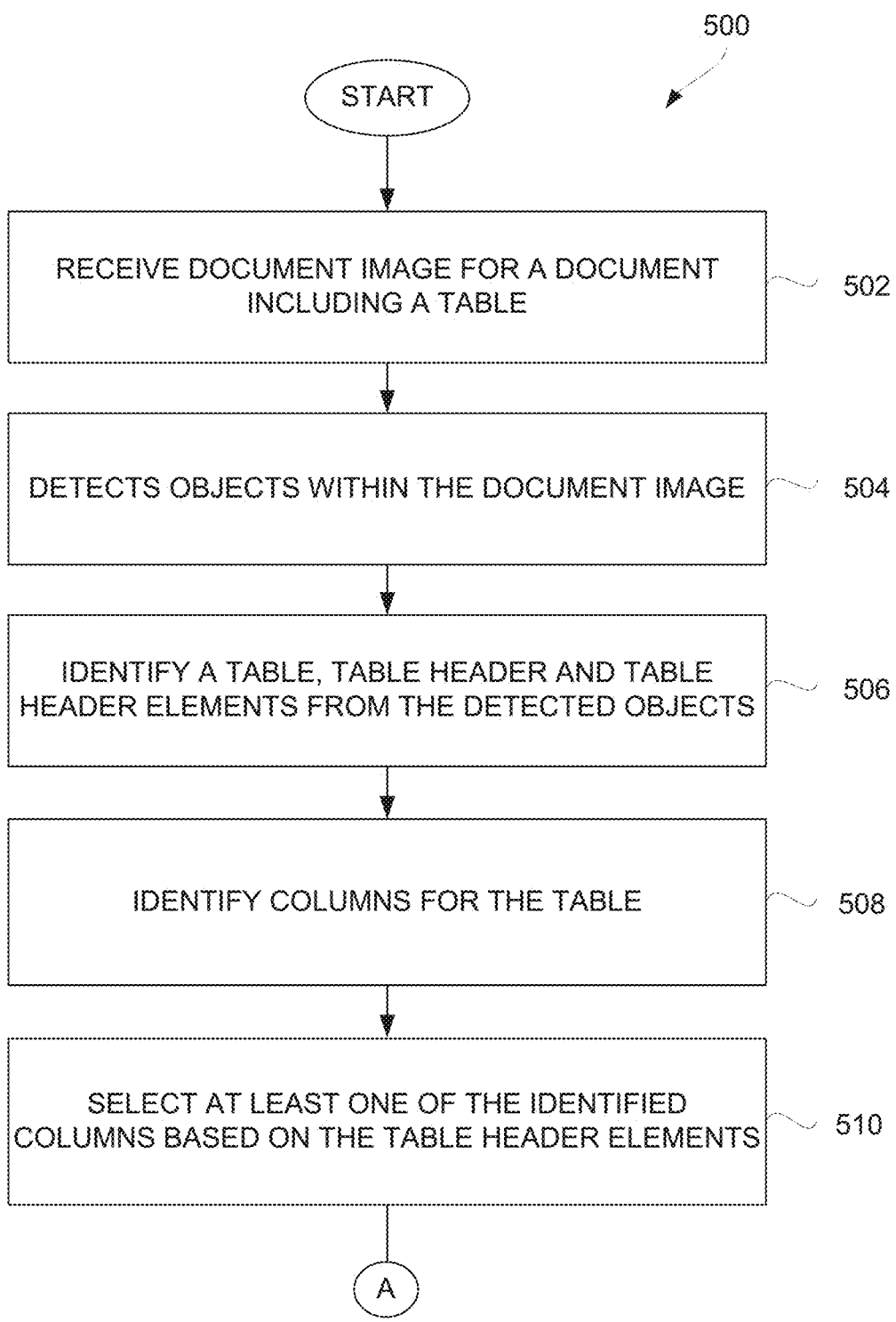
FIG. 5A-5D are flow diagrams of a table data extraction process according to still another embodiment.
Figure 5B:
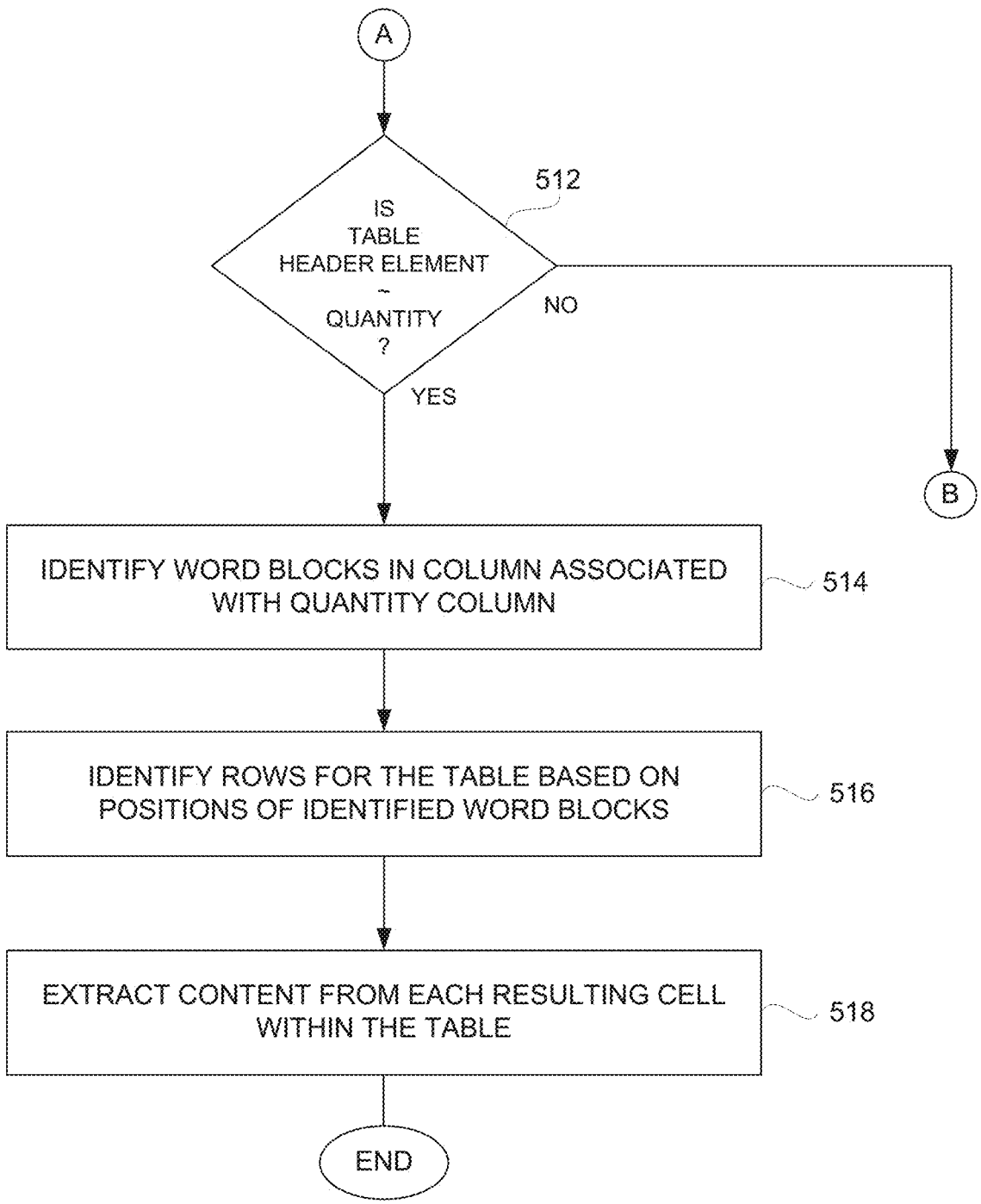
Figure 5C:
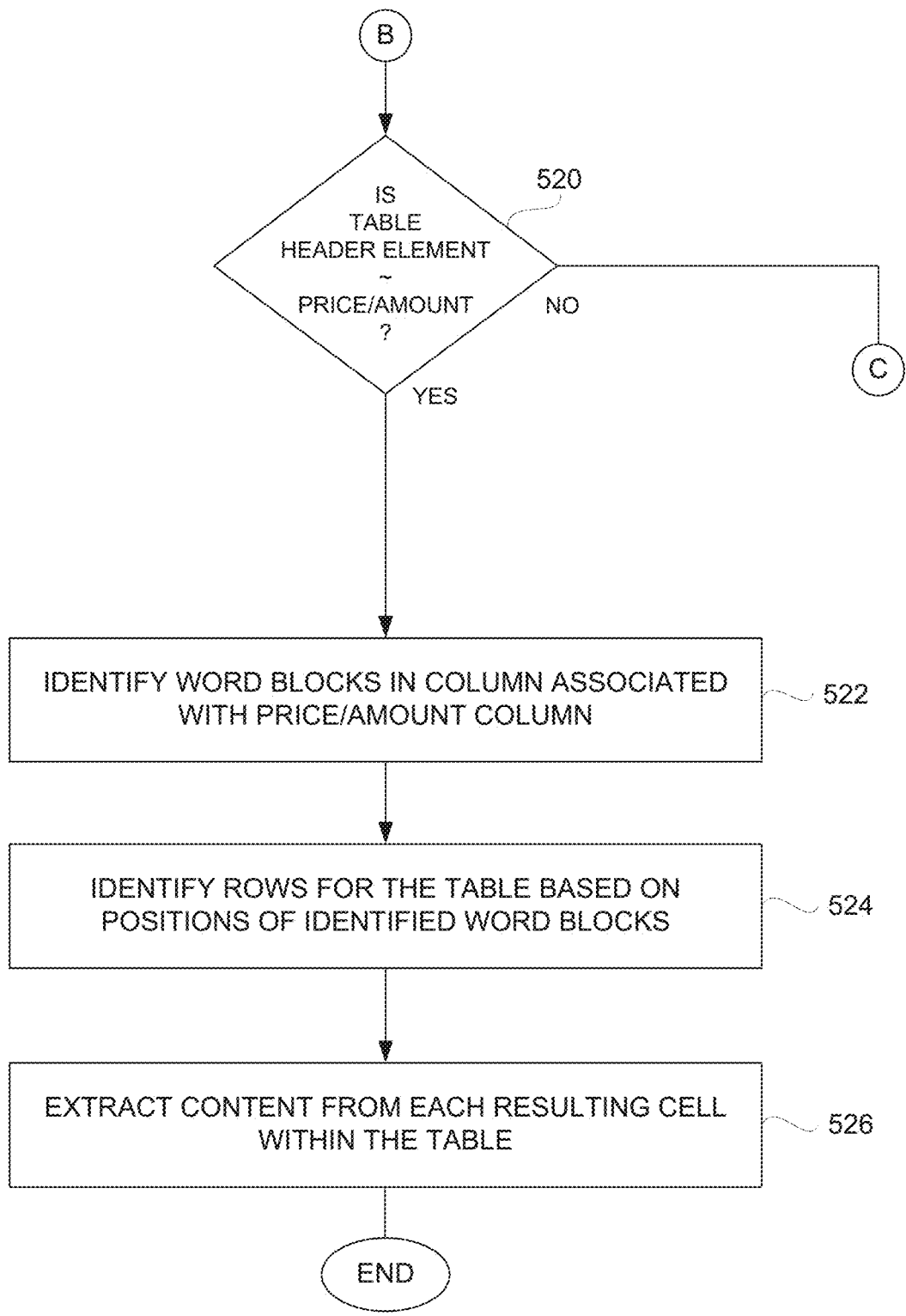

On the other hand, when the decision 512 determines that the table header element does not correspond to quantity, then the table data extraction process 500 can perform other processing, such as shown in FIG. 5C. The other processing can proceed with a decision 520 that determines whether the table header element corresponds to a price or amount. Here, the table header element can be "price" or amount" or an alias therefor, such as "total." When the decision 520 determines that the table header element does approximately correspond to a price or amount, then word blocks in the column associated with the price/amount column can be identified 522. Then, rows for the table can be identified 524 based on positions of the identified word blocks. After the rows for the table have been identified 524, the table data extraction process 500 can proceed to extract 526 content from each resulting cell within the table.

Figure 5D:
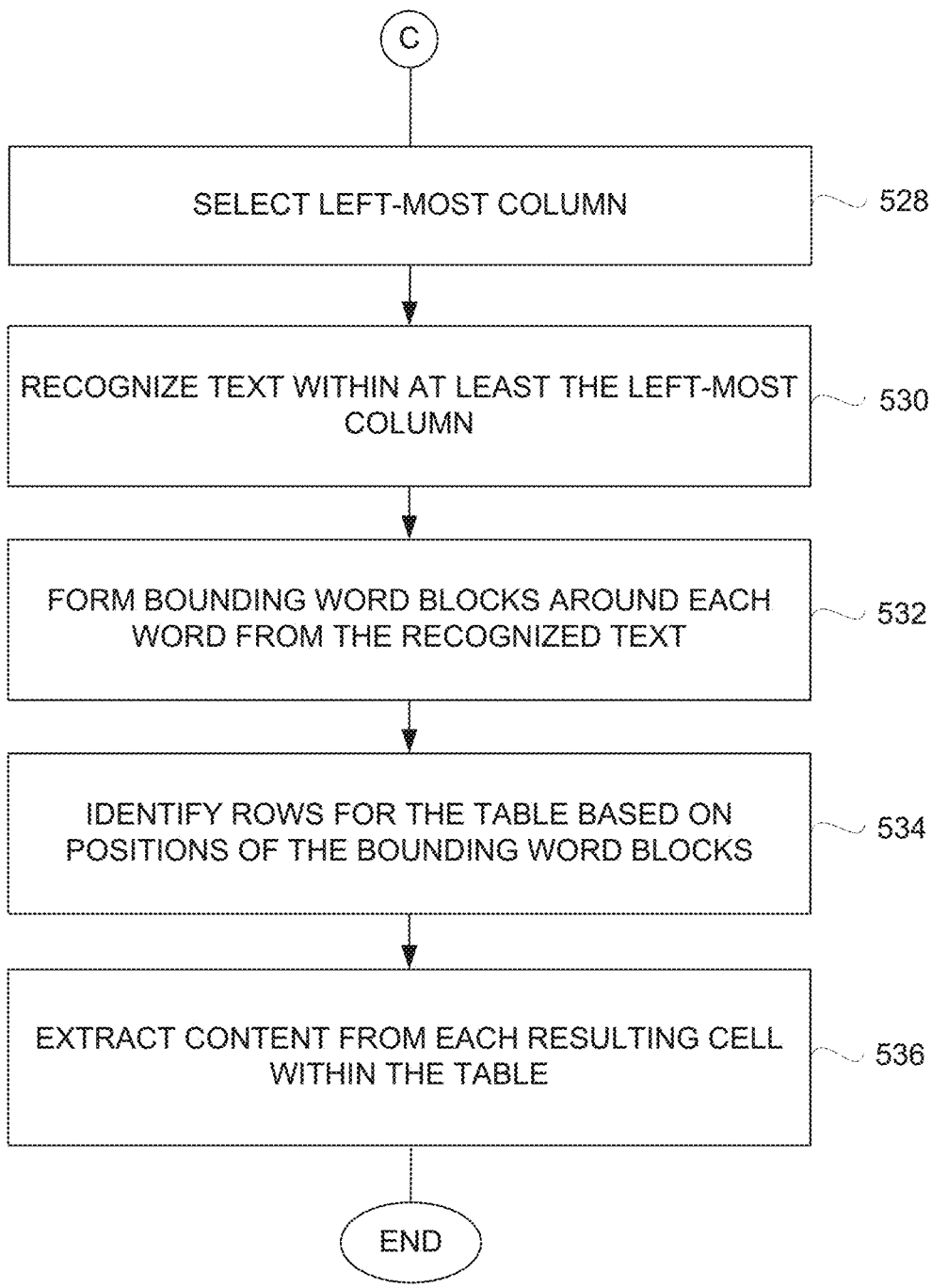
Figure 6A:
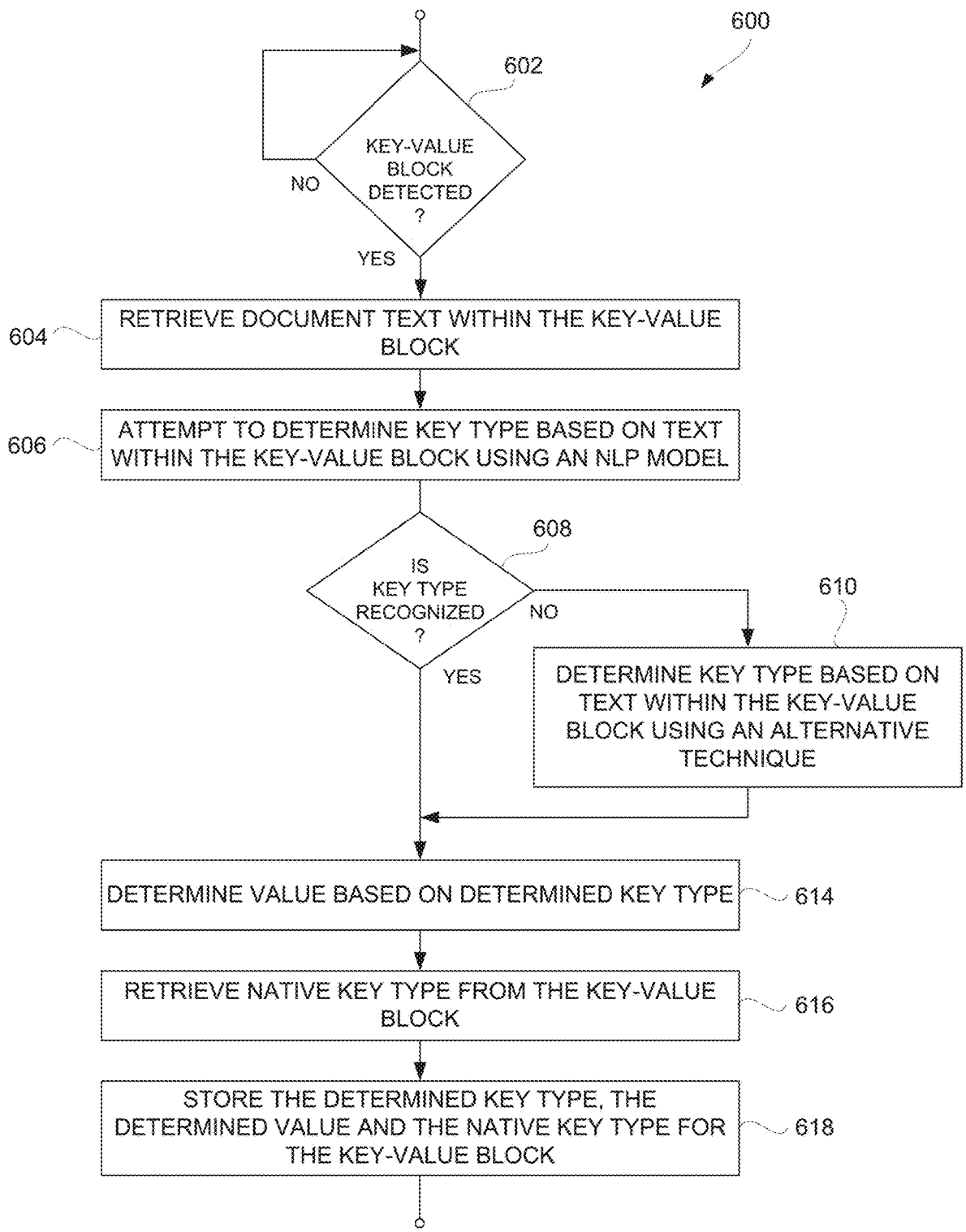
FIG. 6A is a flow diagram of a key-value block process according to one embodiment.

On the other hand, when the decision 520 determines that the selected table header element does not correspond to price or amount, then the table data extraction process 500 can perform other processing, such as shown in FIG. 5D. The other processing can proceed by selection 528 of a left-most column from the columns identified within the table. Then, the table data extraction process 500 can recognize 530 text within the left-most column. Thereafter, bounding word blocks can be formed 532 around each word from the recognized text. Rows for the table can then be identified 534 based on positions of the bounding word blocks. Finally, content from each resulting cell within the table can be extracted 536. Following the block 518, the table data extraction process 500 can end. FIG. 6A is a flow diagram of a key-value block process 600 according to one embodiment. The key-value block process 600 can, for example, be performed by a document extraction program, such as the extraction program 106 illustrated in FIG. 1 or the performance 318 of key-value block processing illustrated in FIG. 3A.

The key-value block process 600 can begin with a decision 602 that determines whether a key-value block has been detected. When the decision 602 determines that a key-value block is not been detected, then the key-value block process 600 can await receipt of an incoming key-value block to be processed.

On the other hand, when the decision 602 determines that a key-value block has been detected, document text within the key-value block can be retrieved 604. Here, the key-value block is typically associated with a document that has been previously been processed to recognize its characters. The document is typically an image of a document, and its processing is typically referred to as Optical Character Recognition (OCR). In one implementation, the key-value block identifies a bounding box for a key-value pair. The text of interest is typically the text within the bounding box for the key-value block that has been retrieved 604.

Next, the key-value block process 600 can attempt 606 to determine a key type of the key-value pair within the key-value block based on the text within the key-value block using a Natural Language Processing (NLP) model. A NLP model is one implementation of machine learning. Natural Language Processing (NLP) is a field of Artificial Intelligence (AI) that quantifies human language to make it intelligible to machines.

A decision 608 can then determine whether a key type has been recognized. When the decision 608 determines that a key type has not been recognized for the key-value block, then the key type can be determined 610 based on the text within the key-value block using an alternative technique. For example, the alternative technique could use pattern matching with respect to text or characters as well as other heuristic approaches. Following the determination 610, or directly following the decision 608 when the key type has been recognized, then a value for the key-value block can be determined 612 based on the determined key type. As an example, in a case in which the document involved is an invoice, the key-value pair provided within the key-value block can pertain to a key type of "Invoice No." and a value of "123456".

Additionally, a native key type can be retrieved 614 from the key-value block. The native key type is the particular key type utilized in the key-value block. As compared to the determined key type, the native key type is derived from the document itself, whereas the determined key type is a uniform key type that is used as a primary classification. For example, a plurality of different aliases that refer to an invoice number can all utilize the same determined key type, such as "invoice_number". Thereafter, the determined key type, the determined value and the native key type for the key-value block can all be stored 616. Following the block 616, the key-value block process 600 has completed with the recognition on the key type and value pertaining to the key-value block.

Figure 6B:
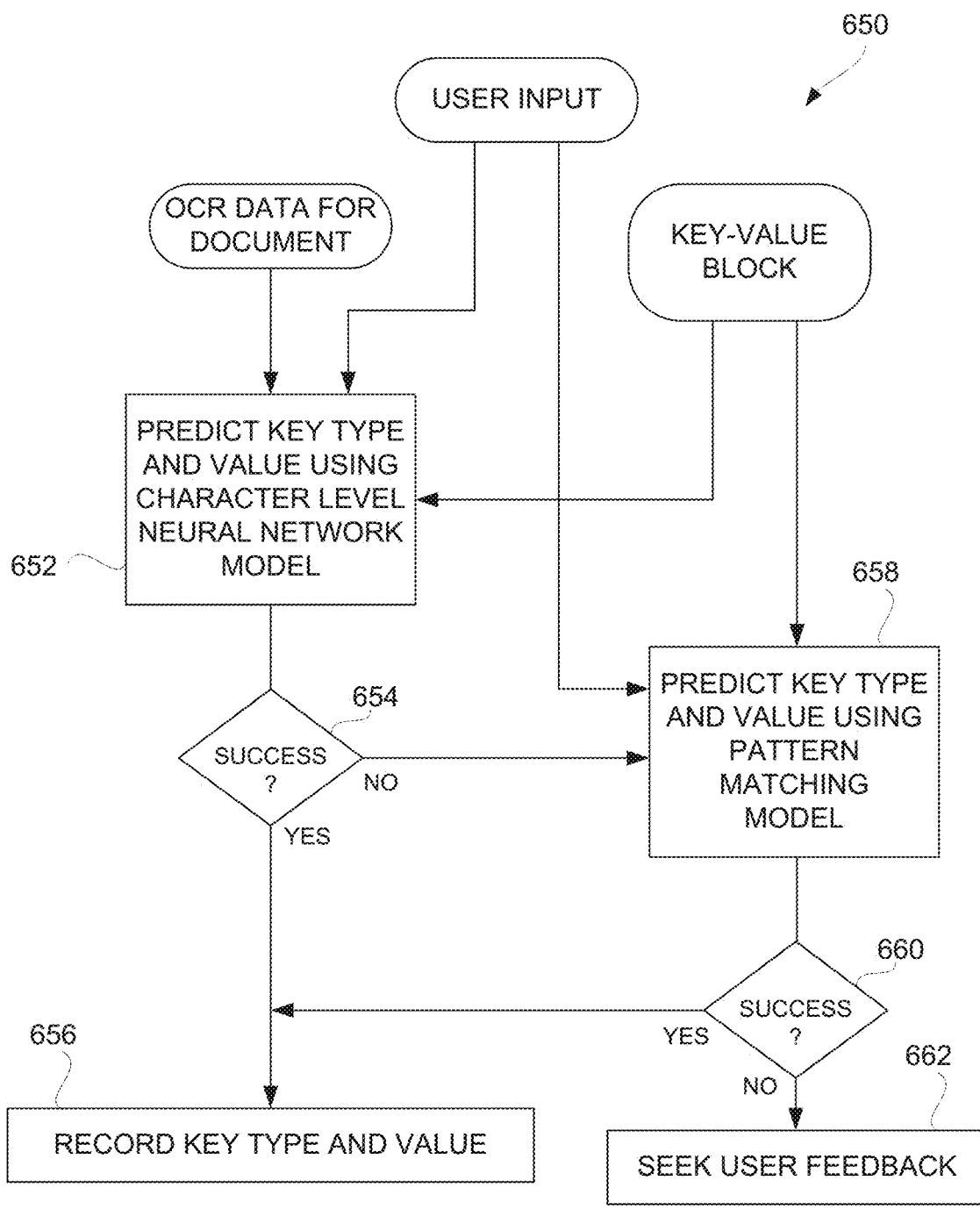
FIG. 6B is a key-value extraction system according to one embodiment.

FIG. 6B is a key-value extraction system 650 according to one embodiment. The key-value extraction system 650 can support or perform the key-value block process 600, the extraction program 106, or performance 318 of key-value block processing illustrated in FIG. 3A. The key-value extraction system 650 can also implement one or more of the blocks 208-218 illustrated in FIG. 2

The key-value extraction system 650 receives a key-value block to be processed. The key-value block is associated with a document that is being processed. The key-value extraction system 650 can also receive, request or provide OCR data for the document. Included with the OCR data would be the particular OCR data that is associated with the position of the key-value block within the document. Still further, depending upon implementation, the key-value extraction system 650 can also include or make use of a user input. For example, a user input can be a request for an extraction application to extract certain data or fields from the document. The data or fields from the document pertain to certain key-value pairs that are desired by the user.

The key-value extraction system 650 includes a character level neural network model 652 that serves to predict a key type and value for the key-value block. A decision 654 can be used to determine whether the character level neural network model 652 has been able to successfully predict the key type and value for the key-value block. When the decision 654 determines that the character level neural network model 652 has been successful, the key type and value can be recorded 656. After the key type and value have been recorded 656, the key-value extraction system 650 is complete with the key type and value having been determined and recorded.

On the other hand, when the decision 654 determines that the character level neural network model 652 has not been able to successfully predict the key type and value, a pattern matching model 658 can be used to predict key type and value for the key-value block. A decision 660 can then determine whether the pattern matching model has been successful in predicting the key type and value for the key-value block. When the decision 660 determines that the pattern matching model has been successful, then the key type and value can be recorded 656. Alternatively, when the decision 660 determines that the pattern matching model has not been able to successfully predict the key type and value, then the key-value extraction system 650 can seek user feedback 662 in a further effort to determine key type and value for the key-value block.

Optionally, the key-value extraction system 650 can receive and utilize a user input. The user input can be supplied to one or both of the neural network model 652 and the pattern matching model 658. These models 652, 658 can potentially benefit from an understanding of the user's desire to extract particular key-value information from the underlying document. The understanding of the user's desire can be utilized to ensure that the key-value extraction system 650 provides a prediction for the key type and value that are of interest to the user even in situations where the prediction may have a reduced confidence level.

In one embodiment, the character level neural network model 652 is implemented using a Character-level Convolutional Network (CharCNN) and Bidirectional Gated Recurrent Units (GRUs) Network, which is able to perform well even with misspelled words and strings lacking semantic context. Here, the character level neural network model 652 can be a Keras-based model.

As illustrated in FIG. 6B, in one embodiment, the key-value extraction system 650 can first attempt to extract key-value data from a key-value block using the neural network model 652. Then, if that is not successful, then a second attempt to extract key-value data from the key-value block can be done using the pattern matching model 658. In another embodiment, an alternative machine learning model can be attempted after the neural network model 652 is unsuccessful and before using the pattern matching model 658.

Additional details on detecting objects can be found in DETECTION OF USER INTERFACE CONTROLS VIA INVARIANCE GUIDED SUB-CONTROL LEARNING, U.S. application Ser. No. 16/876,530, filed May 18, 2020, which is hereby incorporated by reference herein.

The various aspects disclosed herein can be utilized with or by robotic process automation systems. Exemplary robotic process automation systems and operations thereof are detailed below.

Figure 7:
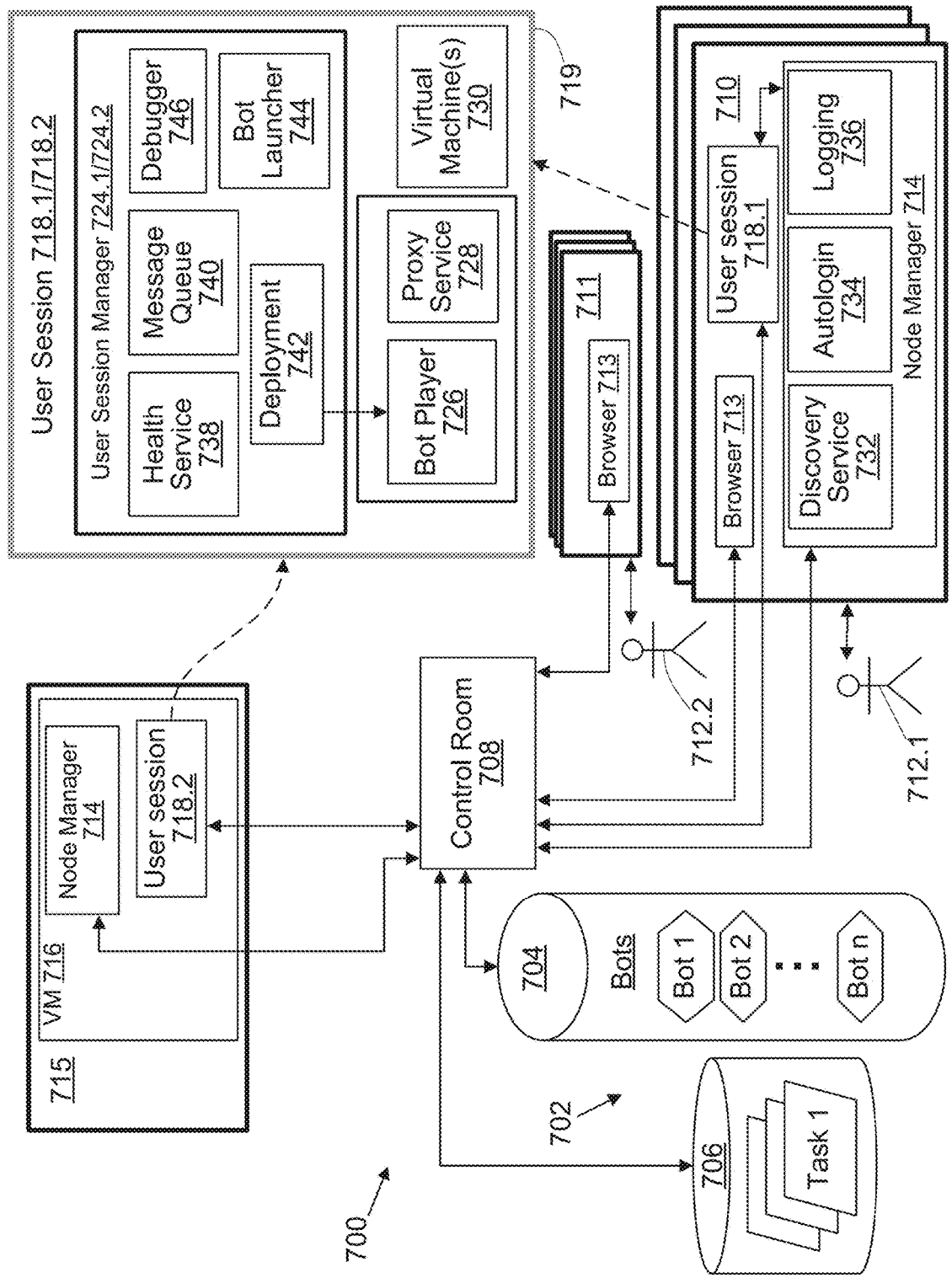
FIG. 7 is a block diagram of a Robotic Process Automation (RPA) system according to one embodiment.

FIG. 7 is a block diagram of a robotic process automation (RPA) system 700 according to one embodiment. The RPA system 700 includes data storage 702. The data storage 702 can store a plurality of software robots 704, also referred to as bots (e.g., Bot 1, Bot 2, . . . , Bot n, where n is an integer). The software robots 704 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 726), on which a bot will execute or is executing. The data storage 702 can also stores a plurality of work items 706. Each work item 706 can pertain to processing executed by one or more of the software robots 704.

The RPA system 700 can also include a control room 708. The control room 708 is operatively coupled to the data storage 702 and is configured to execute instructions that, when executed, cause the RPA system 700 to respond to a request from a client device 710 that is issued by a user 712.1. The control room 708 can act as a server to provide to the client device 710 the capability to perform an automation task to process a work item from the plurality of work items 706. The RPA system 700 is able to support multiple client devices 710 concurrently, each of which will have one or more corresponding user session(s) 718 (e.g., 718.1, 718.2, 718.3, 718.4), which provides a context for respective users 712 (e.g., 712.1, 712.2, 712.3, 712.4). The context can, for example, include security, permissions, audit trails, etc. to define the permissions and roles for bots operating under the user session 718. For example, a bot executing under a user session, cannot access any files or use any applications that the user, under whose credentials the bot is operating, does not have permission to do so. This prevents any inadvertent or malicious acts from a bot under which bot 704 executes.

The control room 708 can provide, to the client device 710, software code to implement a node manager 714. The node manager 714 executes on the client device 710 and provides a user 712 a visual interface via browser 713 to view progress of and to control execution of automation tasks. The node manager 714 can, for example, include a discovery service 732, an autologin 734, and a logging 736. It should be noted that the node manager 714 can be provided to the client device 710 on demand, when required by the client device 710, to execute a desired automation task. In one embodiment, the node manager 714 may remain on the client device 710 after completion of the requested automation task to avoid the need to download it again. In another embodiment, the node manager 714 may be deleted from the client device 710 after completion of the requested automation task. The node manager 714 can also maintain a connection to the control room 708 to inform the control room 708 that device 710 is available for service by the control room 708, irrespective of whether a live user session 718 exists. When executing a bot 704, the node manager 714 can impersonate the user 712 by employing credentials associated with the user 712.

The control room 708 initiates, on the client device 710, a user session 718 (seen as a specific instantiation 718.1) to perform the automation task. The control room 708 retrieves the set of task processing instructions 704 that correspond to the work item 706. The task processing instructions 704 that correspond to the work item 706 can execute under control of the user session 718.1, on the client device 710. The node manager 714 can provide update data indicative of status of processing of the work item to the control room 708. The control room 708 can terminate the user session 718.1 upon completion of processing of the work item 706. The user session 718.1 is shown in further detail at 719, where an instance 724.1 of user session manager 724 is seen along with a bot player 726, proxy service 728, and one or more virtual machine(s) 730, such as a virtual machine that runs Java® or Python®. The user session manager 724 provides a generic user session context within which a bot 704 executes.

The bots 704 execute on a bot player, via a computing device, to perform the functions encoded by the bot. Some or all of the bots 704 may, in certain embodiments, be located remotely from the control room 708. Moreover, the devices 710 and 711, which may be conventional computing devices, such as for example, personal computers, server computers, laptops, tablets and other portable computing devices, may also be located remotely from the control room 708. The devices 710 and 711 may also take the form of virtual computing devices. The bots 704 and the work items 706 are shown in separate containers for purposes of illustration but they may be stored in separate or the same device(s), or across multiple devices. The control room 708 can perform user management functions, source control of the bots 704, along with providing a dashboard that provides analytics and results of the bots 704, performs license management of software required by the bots 704 and manages overall execution and management of scripts, clients, roles, credentials, security, etc. The major functions performed by the control room 708 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 708 is shown generally for simplicity of explanation. Multiple instances of the control room 708 may be employed where large numbers of bots are deployed to provide for scalability of the RPA system 700.

In the event that a device, such as device 711 (e.g., operated by user 712.2) does not satisfy the minimum processing capability to run a node manager 714, the control room 708 can make use of another device, such as device 715, that has the requisite capability. In such case, a node manager 714 within a Virtual Machine (VM), seen as VM 716, can be resident on the device 715. The node manager 714 operating on the device 715 can communicate with browser 713 on device 711. This approach permits RPA system 700 to operate with devices that may have lower processing capability, such as older laptops, desktops, and portable/mobile devices such as tablets and mobile phones. In certain embodiments the browser 713 may take the form of a mobile application stored on the device 711. The control room 708 can establish a user session 718.2 for the user 712.2 while interacting with the control room 708 and the corresponding user session 718.2 (operating as described above for user session 718.1) with user session manager 724.2 (operating as described above for user session manager 724.1) operating on device 710 as discussed above.

In certain embodiments, the user session manager 724 provides five functions. First is a health service 738 that maintains and provides a detailed logging of bot execution including monitoring memory and CPU usage by the bot and other parameters such as number of file handles employed. The bots 704 can employ the health service 738 as a resource to pass logging information to the control room 708. Execution of the bot is separately monitored by the user session manager 724 to track memory, CPU, and other system information. The second function provided by the user session manager 724 is a message queue 740 for exchange of data between bots executed within the same user session 718. The third function is a deployment service (also referred to as a deployment module) 742 that connects to the control room 708 to request execution of a requested bot 704. The deployment service 742 can also ensure that the environment is ready for bot execution, such as by making available dependent libraries. The fourth function is a bot launcher 744 which can read metadata associated with a requested bot 704 and launch an appropriate container and begin execution of the requested bot. The fifth function is a debugger service 746 that can be used to debug bot code.

The bot player 726 can execute, or play back, a sequence of instructions encoded in a bot. The sequence of instructions can, for example, be captured by way of a recorder when a human performs those actions, or alternatively the instructions are explicitly coded into the bot. These instructions enable the bot player 726, to perform the same actions as a human would do in their absence. In one implementation, the instructions can compose of a command (or action) followed by set of parameters. For example, Open Browser is a command and a URL would be the parameter for it to launch a web resource. Proxy service 728 can enable integration of external software or applications with the bot to provide specialized services. For example, an externally hosted artificial intelligence system can enable the bot to understand the meaning of a "sentence."

The user 712.1 can interact with node manager 714 via a conventional browser 713 which employs the node manager 714 to communicate with the control room 708. When the user 712.1 logs in from the client device 710 to the control room 708 for the first time, the user 712.1 can be prompted to download and install the node manager 714 on the device 710, if one is not already present. The node manager 714 can establish a web socket connection to the user session manager 724, deployed by the control room 708 that lets the user 712.1 subsequently create, edit, and deploy the bots 704.

Figure 8:
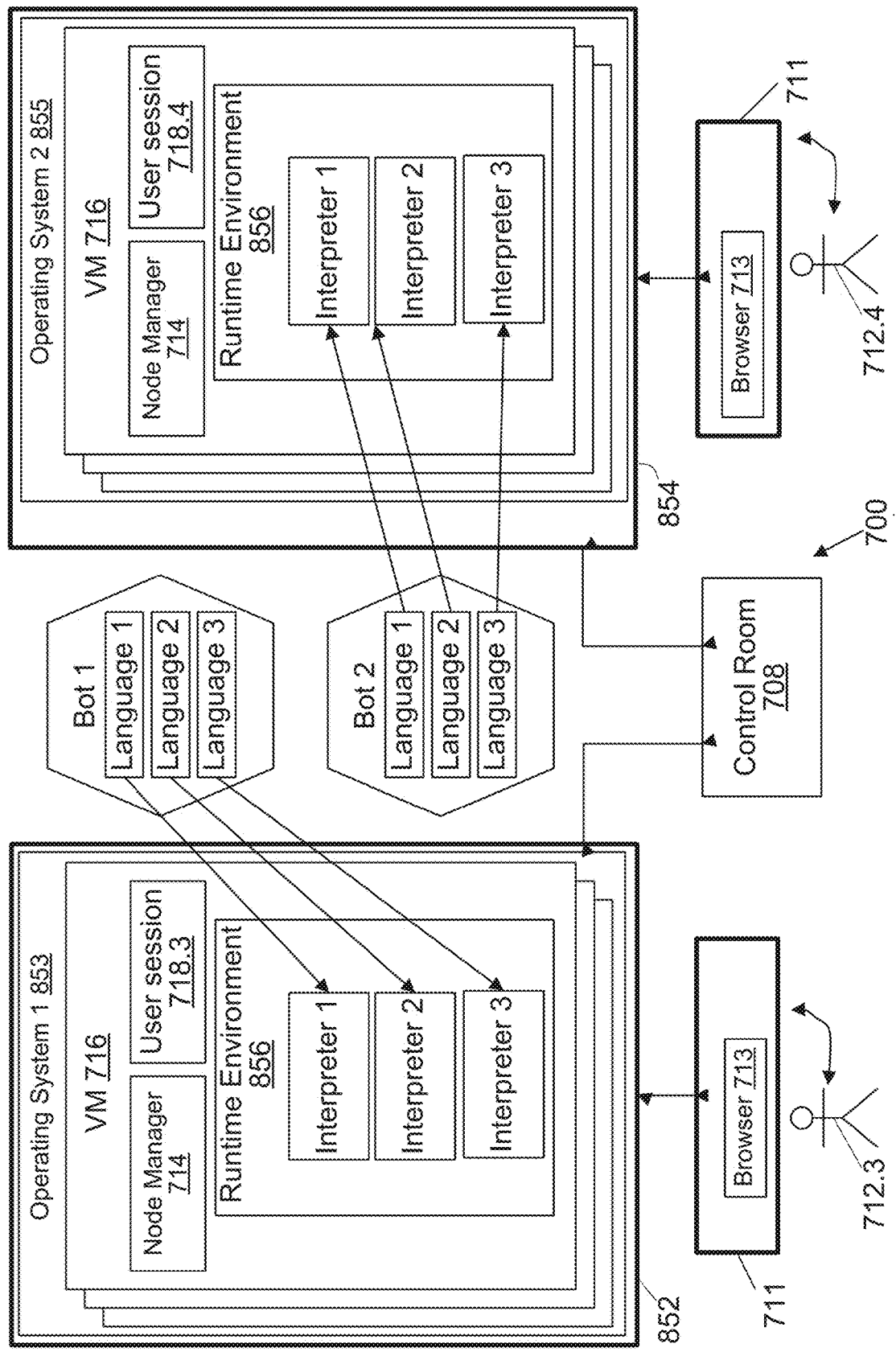
FIG. 8 is a block diagram of a generalized runtime environment for bots in accordance with another embodiment of the RPA system illustrated in FIG. 7.

FIG. 8 is a block diagram of a generalized runtime environment for bots 704 in accordance with another embodiment of the RPA system 700 illustrated in FIG. 7. This flexible runtime environment advantageously permits extensibility of the platform to enable use of various languages in encoding bots. In the embodiment of FIG. 8, RPA system 700 generally operates in the manner described in connection with FIG. 7, except that in the embodiment of FIG. 8, some or all of the user sessions 718 execute within a virtual machine 716. This permits the bots 704 to operate on an RPA system 700 that runs on an operating system different from an operating system on which a bot 704 may have been developed. For example, if a bot 704 is developed on the Windows® operating system, the platform agnostic embodiment shown in FIG. 8 permits the bot 704 to be executed on a device 852 or 854 executing an operating system 853 or 855 different than Windows®, such as, for example, Linux. In one embodiment, the VM 716 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 8, multiple devices 852 can execute operating system 1, 853, which may, for example, be a Windows® operating system. Multiple devices 854 can execute operating system 2, 855, which may, for example, be a Linux® operating system. For simplicity of explanation, two different operating systems are shown, by way of example and additional operating systems such as the macOS®, or other operating systems may also be employed on devices 852, 854 or other devices. Each device 852, 854 has installed therein one or more VM's 716, each of which can execute its own operating system (not shown), which may be the same or different than the host operating system 853/855. Each VM 716 has installed, either in advance, or on demand from control room 708, a node manager 714. The embodiment illustrated in FIG. 8 differs from the embodiment shown in FIG. 7 in that the devices 852 and 854 have installed thereon one or more VMs 716 as described above, with each VM 716 having an operating system installed that may or may not be compatible with an operating system required by an automation task. Moreover, each VM has installed thereon a runtime environment 856, each of which has installed thereon one or more interpreters (shown as interpreter 1, interpreter 2, interpreter 3). Three interpreters are shown by way of example but any run time environment 856 may, at any given time, have installed thereupon less than or more than three different interpreters. Each interpreter 856 is specifically encoded to interpret instructions encoded in a particular programming language. For example, interpreter 1 may be encoded to interpret software programs encoded in the Java® programming language, seen in FIG. 8 as language 1 in Bot 1 and Bot 2. Interpreter 2 may be encoded to interpret software programs encoded in the Python® programming language, seen in FIG. 8 as language 2 in Bot 1 and Bot 2, and interpreter 3 may be encoded to interpret software programs encoded in the R programming language, seen in FIG. 8 as language 3 in Bot 1 and Bot 2.

Turning to the bots Bot 1 and Bot 2, each bot may contain instructions encoded in one or more programming languages. In the example shown in FIG. 8, each bot can contain instructions in three different programming languages, for example, Java®, Python® and R. This is for purposes of explanation and the embodiment of FIG. 8 may be able to create and execute bots encoded in more or less than three programming languages. The VMs 716 and the runtime environments 856 permit execution of bots encoded in multiple languages, thereby permitting greater flexibility in encoding bots. Moreover, the VMs 716 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 708 will select a device with a VM 716 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 9:
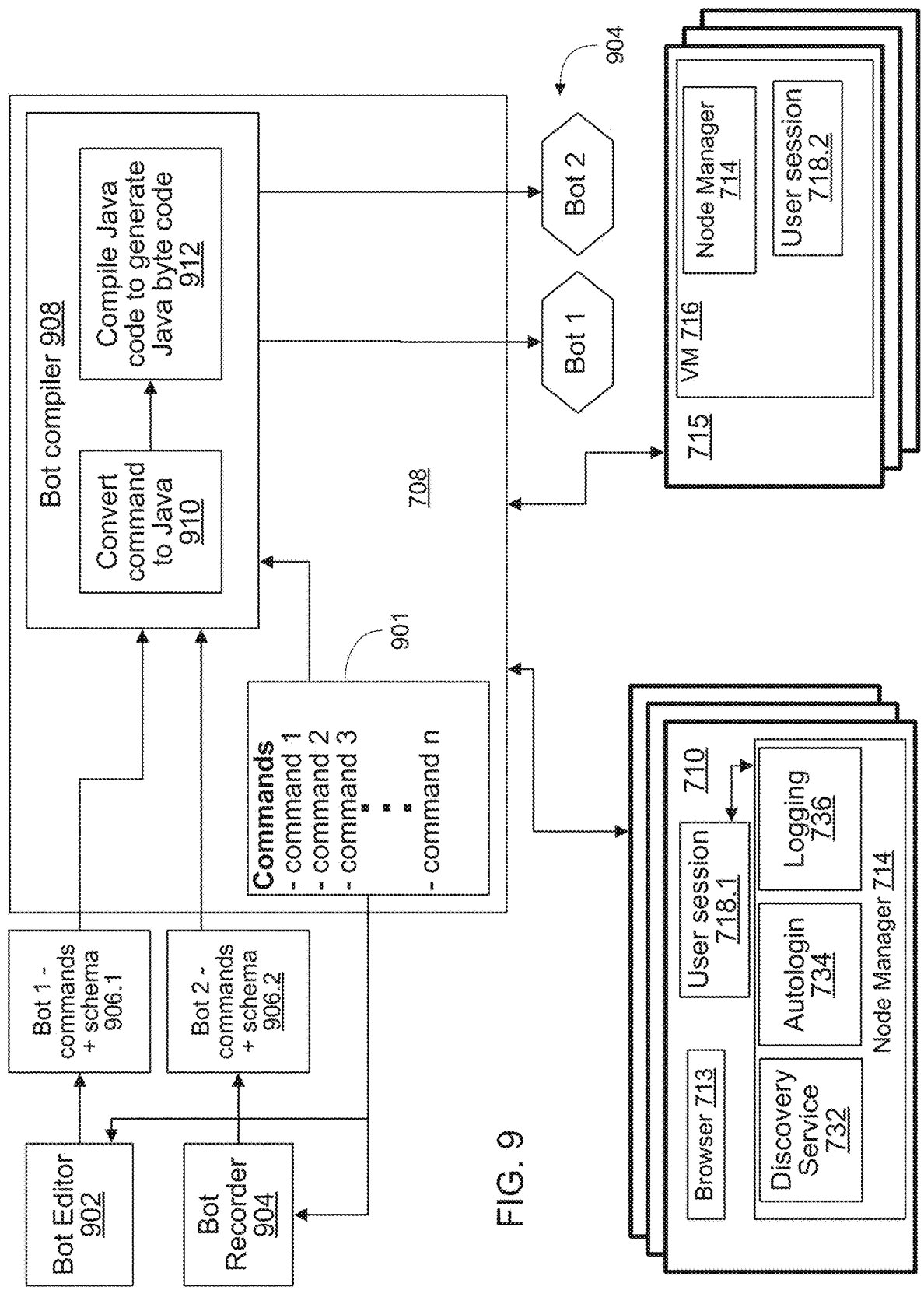
FIG. 9 illustrates a block diagram of yet another embodiment of the RPA system of FIG. 7 configured to provide platform independent sets of task processing instructions for bots.

FIG. 9 illustrates a block diagram of yet another embodiment of the RPA system 700 of FIG. 7 configured to provide platform independent sets of task processing instructions for bots 704. Two bots 704, bot 1 and bot 2 are shown in FIG. 9. Each of bots 1 and 2 are formed from one or more commands 901, each of which specifies a user level operation with a specified application program, or a user level operation provided by an operating system. Sets of commands 906.1 and 906.2 may be generated by bot editor 902 and bot recorder 904, respectively, to define sequences of application level operations that are normally performed by a human user. The bot editor 902 may be configured to combine sequences of commands 901 via an editor. The bot recorder 904 may be configured to record application level operations performed by a user and to convert the operations performed by the user to commands 901. The sets of commands 906.1 and 906.2 generated by the editor 902 and the recorder 904 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 708 operates to compile, via compiler 908, the sets of commands generated by the editor 902 or the recorder 904 into platform independent executables, each of which is also referred to herein as a bot JAR (Java ARchive) that perform application level operations captured by the bot editor 902 and the bot recorder 904. In the embodiment illustrated in FIG. 9, the set of commands 906, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 710 and/or 715 to perform the encoded application level operations that are normally performed by a human user.

Figure 10:
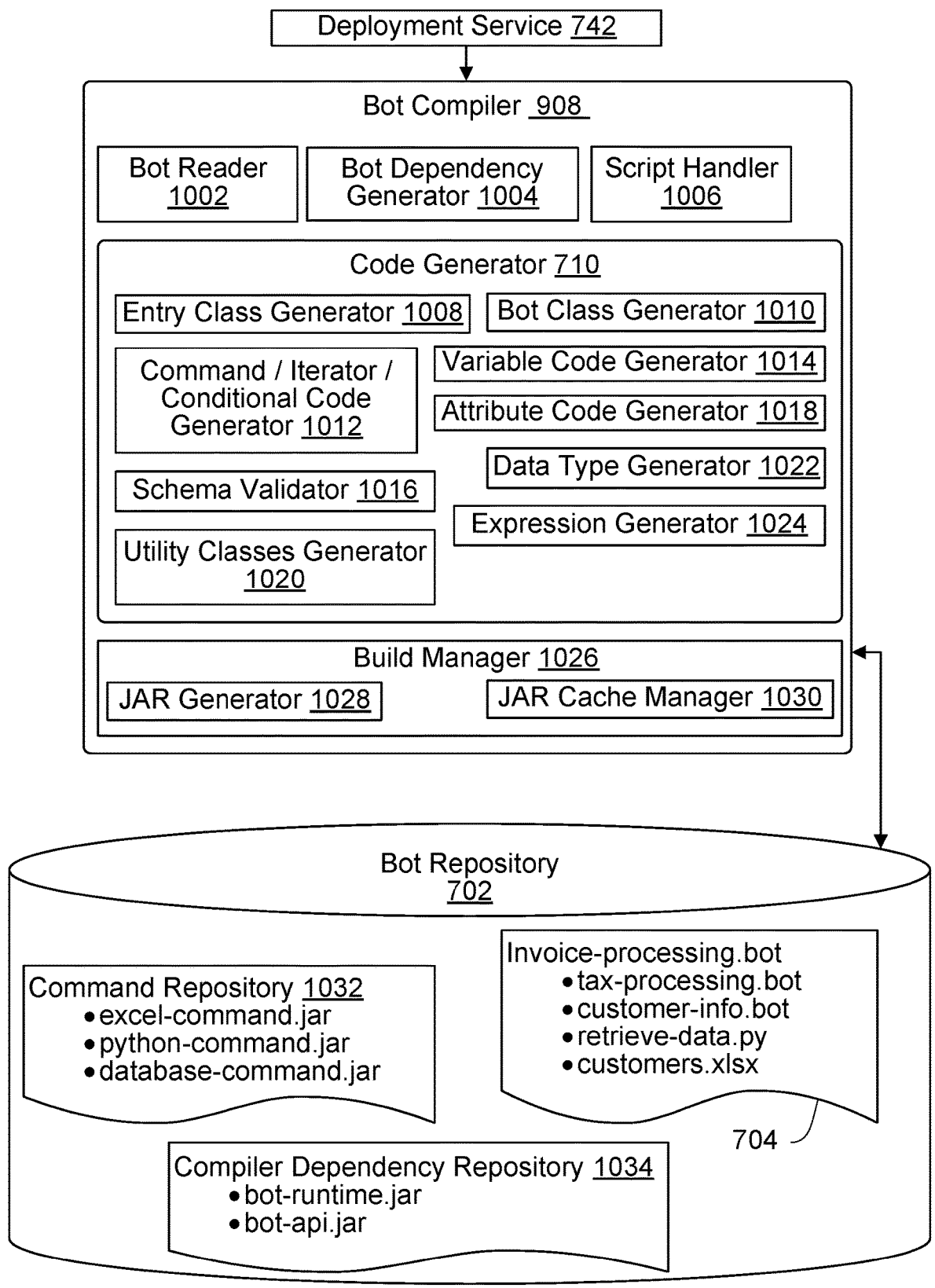
FIG. 10 is a block diagram illustrating details of one embodiment of the bot compiler illustrated in FIG. 9.

FIG. 10 is a block diagram illustrating details of one embodiment of the bot compiler 908 illustrated in FIG. 9. The bot compiler 908 accesses one or more of the bots 704 from the data storage 702, which can serve as bot repository, along with commands 901 that are contained in a command repository 1032. The bot compiler 708 can also access compiler dependency repository 1034. The bot compiler 708 can operate to convert each command 901 via code generator module 910 to an operating system independent format, such as a Java command. The bot compiler 708 then compiles each operating system independent format command into byte code, such as Java byte code, to create a bot JAR. The convert command to Java module 910 is shown in further detail in in FIG. 10 by JAR generator 1028 of a build manager 1026. The compiling to generate Java byte code module 912 can be provided by the JAR generator 1028. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 9, deployment service 742 can be responsible to trigger the process of bot compilation and then once a bot has compiled successfully, to execute the resulting bot JAR on selected devices 710 and/or 715. The bot compiler 908 can comprises a number of functional modules that, when combined, generate a bot 704 in a JAR format. A bot reader 1002 loads a bot file into memory with class representation. The bot reader 1002 takes as input a bot file and generates an in-memory bot structure. A bot dependency generator 1004 identifies and creates a dependency graph for a given bot. It includes any child bot, resource file like script, and document or image used while creating a bot. The bot dependency generator 1004 takes, as input, the output of the bot reader 1002 and provides, as output, a list of direct and transitive bot dependencies. A script handler 1006 handles script execution by injecting a contract into a user script file. The script handler 1006 registers an external script in manifest and bundles the script as a resource in an output JAR. The script handler 1006 takes, as input, the output of the bot reader 1002 and provides, as output, a list of function pointers to execute different types of identified scripts like Python, Java, VB scripts.

An entry class generator 1008 can create a Java class with an entry method, to permit bot execution to be started from that point. For example, the entry class generator 1008 takes, as an input, a parent bot name, such "Invoice-processing-.bot" and generates a Java class having a contract method with a predefined signature. A bot class generator 1010 can generate a bot class and orders command code in sequence of execution. The bot class generator 1010 can take, as input, an in-memory bot structure and generates, as output, a Java class in a predefined structure. A Command/Iterator/Conditional Code Generator 1012 wires up a command class with singleton object creation, manages nested command linking, iterator (loop) generation, and conditional (If/Else If/Else) construct generation. The Command/Iterator/Conditional Code Generator 1012 can take, as input, an in-memory bot structure in JSON format and generates Java code within the bot class. A variable code generator 1014 generates code for user defined variables in the bot, maps bot level data types to Java language compatible types, and assigns initial values provided by user. The variable code generator 1014 takes, as input, an in-memory bot structure and generates Java code within the bot class. A schema validator 1016 can validate user inputs based on command schema and includes syntax and semantic checks on user provided values. The schema validator 1016 can take, as input, an in-memory bot structure and generates validation errors that it detects. The attribute code generator 1018 can generate attribute code, handles the nested nature of attributes, and transforms bot value types to Java language compatible types. The attribute code generator 1018 takes, as input, an in-memory bot structure and generates Java code within the bot class. A utility classes generator 1020 can generate utility classes which are used by an entry class or bot class methods. The utility classes generator 1020 can generate, as output, Java classes. A data type generator 1022 can generate value types useful at runtime. The data type generator 1022 can generate, as output, Java classes. An expression generator 1024 can evaluate user inputs and generates compatible Java code, identifies complex variable mixed user inputs, inject variable values, and transform mathematical expressions. The expression generator 1024 can take, as input, user defined values and generates, as output, Java compatible expressions.

The JAR generator 1028 can compile Java source files, produces byte code and packs everything in a single JAR, including other child bots and file dependencies. The JAR generator 1028 can take, as input, generated Java files, resource files used during the bot creation, bot compiler dependencies, and command packages, and then can generate a JAR artifact as an output. The JAR cache manager 1030 can put a bot JAR in cache repository so that recompilation can be avoided if the bot has not been modified since the last cache entry. The JAR cache manager 1030 can take, as input, a bot JAR.

In one or more embodiment described herein command action logic can be implemented by commands 901 available at the control room 708. This permits the execution environment on a device 710 and/or 715, such as exists in a user session 718, to be agnostic to changes in the command action logic implemented by a bot 704. In other words, the manner in which a command implemented by a bot 704 operates need not be visible to the execution environment in which a bot 704 operates. The execution environment is able to be independent of the command action logic of any commands implemented by bots 704. The result is that changes in any commands 901 supported by the RPA system 700, or addition of new commands 901 to the RPA system 700, do not require an update of the execution environment on devices 710, 715. This avoids what can be a time and resource intensive process in which addition of a new command 901 or change to any command 901 requires an update to the execution environment to each device 710, 715 employed in a RPA system. Take, for example, a bot that employs a command 901 that logs into an on-online service. The command 901 upon execution takes a Uniform Resource Locator (URL), opens (or selects) a browser, retrieves credentials corresponding to a user on behalf of whom the bot is logging in as, and enters the user credentials (e.g. username and password) as specified. If the command 901 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 11:
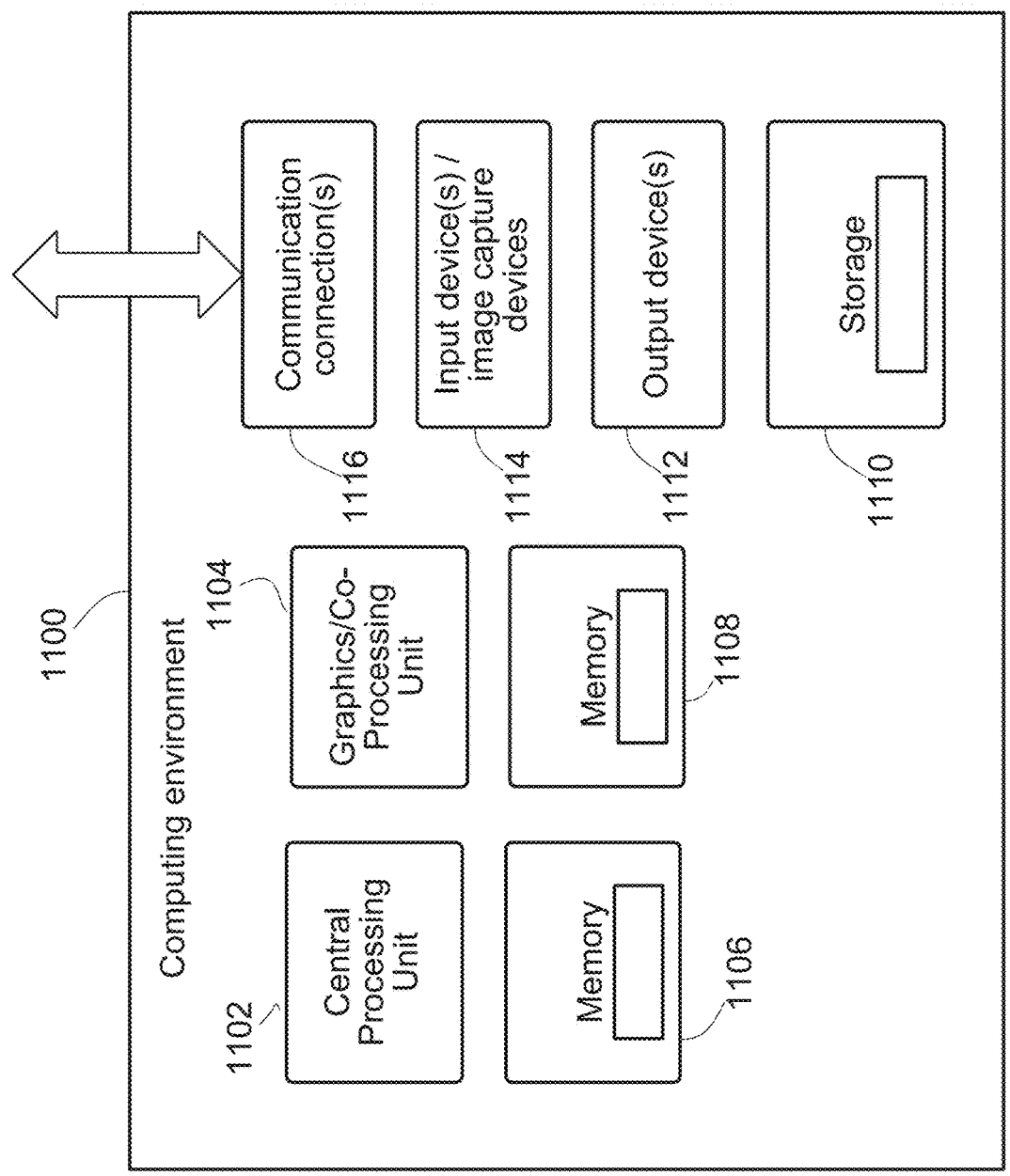
FIG. 11 illustrates a block diagram of an exemplary computing environment for an implementation of an RPA system, such as the RPA systems disclosed herein.

FIG. 11 illustrates a block diagram of an exemplary computing environment 1100 for an implementation of an RPA system, such as the RPA systems disclosed herein. The embodiments described herein may be implemented using the exemplary computing environment 1100. The exemplary computing environment 1100 includes one or more processing units 1102, 1104 and memory 1106, 1108. The processing units 1102, 1106 execute computer-executable instructions. Each of the processing units 1102, 1106 can be a general-purpose central processing unit (CPU), processor in an application-specific integrated circuit (ASIC) or any other type of processor. For example, as shown in FIG. 11, the processing unit 1102 can be a CPU, and the processing unit can be a graphics/co-processing unit (GPU). The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1100 may be rearranged in various embodiments, and some embodiments may not require nor include all of the above components, while other embodiments may include additional components, such as specialized processors and additional memory.

The exemplary computing environment 1100 may have additional features such as, for example, tangible storage 1110, one or more input devices 1114, one or more output devices 1112, and one or more communication connections 1116. An interconnection mechanism (not shown) such as a bus, controller, or network can interconnect the various components of the exemplary computing environment 1100. Typically, operating system software (not shown) provides an operating system for other software executing in the exemplary computing environment 1100, and coordinates activities of the various components of the exemplary computing environment 1100.

The tangible storage 1110 may be removable or non-removable, and includes magnetic disks, magnetic tapes or cassettes, CD-ROMs, DVDs, or any other medium which can be used to store information in a non-transitory way, and which can be accessed within the computing system 1100. The tangible storage 1110 can store instructions for the software implementing one or more features of a PRA system as described herein.

The input device(s) or image capture device(s) 1114 may include, for example, one or more of a touch input device such as a keyboard, mouse, pen, or trackball, a voice input device, a scanning device, an imaging sensor, touch surface, or any other device capable of providing input to the exemplary computing environment 1100. For multimedia embodiment, the input device(s) 1114 can, for example, include a camera, a video card, a TV tuner card, or similar device that accepts video input in analog or digital form, a microphone, an audio card, or a CD-ROM or CD-RW that reads audio/video samples into the exemplary computing environment 1100. The output device(s) 1112 can, for example, include a display, a printer, a speaker, a CD-writer, or any another device that provides output from the exemplary computing environment 1100.

The one or more communication connections 1116 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for extracting data from an image of a document, the computer-implemented method comprising:

retrieving object data pertaining to an object that has been detected in the image of the document, the object data denoting at least a portion of the document having the object;

acquiring text pertaining to the portion of the document having the object, the text having been recognized from the image of the document;

determining a key type for the object based on the text and a machine learned model, the machine learned model pertaining to at least a character level neural network model having at least a Character-level Convolutional Network and a Bidirectional Gated Recurrent Units Network;

determining a value for the object based on the determined key type for the object; and storing the determined key type and the determined value for the object, wherein the determining of the key type predicts the key type using the character level neural network model, and provides a confidence indication for key type predicted using the character level neural network model, wherein the key type is predicted using the character level neural network model is accepted and recorded if the confidence indication is greater than a threshold level, and wherein the determining of the key type predicts the key type using the pattern matching model is predicted and recorded if the confidence indication associated with prediction using the character level neural network model is not greater that the threshold level.

2. A computer-implemented method as recited in claim 1, wherein the text is recognized through Optical Character Resolution (OCR) of at least a portion of the document.

3. A computer-implemented method as recited in claim 1, wherein the object is an object block, and the object data is provided within the object block.

4. A computer-implemented method as recited in claim 1, wherein the object is a key-value block.

5. A computer-implemented method as recited in claim 1, wherein the key type comprises a textual descriptor.

6. A computer-implemented method as recited in claim 1, wherein the machine learned model is a Natural Language Processing (NLP) model.

7. A computer-implemented method as recited in claim 1, wherein the character level neural network model comprises a Keras-based model.

8. A computer-implemented method as recited in claim 1, wherein a user input is provided to the character level neural network model, and wherein the character level neural network model predicts the key type for the object based at least in part on the user input.

9. A computer-implemented method as recited in claim 1, wherein the document comprises a business transaction document, and wherein the image of the document is provided in a graphical file format.

10. A data extraction system for extracting data from an image of a document, the data extraction system comprising:
   a character level neural network model that receives an object block and recognized text within at least a portion of the document as recognized from the image of the document, the character level neural network model predicting a key type and a value for the object block; and
   a pattern matching model that receives an object block and recognized text within at least a portion of the document as recognized from the image of the document, the pattern matching model predicting a key type and a value for the object block,
   wherein key type and value predicted using the character level neural network model are accepted and recorded if such prediction is successful,
   wherein key type and value predicted using the pattern matching model are accepted and recorded if prediction using the character level neural network model is unsuccessful,
   wherein the character level neural network model provides a confidence indication for key type and value predicted using the character level neural network model,
   wherein key type and value predicted using the character level neural network model are accepted and recorded if the confidence indication is greater than a threshold level, and
   wherein key type and value predicted using the pattern matching model are accepted and recorded if the confidence indication associated with prediction using the character level neural network model is not greater that the threshold level.

11. A data extraction system as recited in claim 10, wherein the object block is a key-value block, wherein key type comprises a textual descriptor, and wherein the image of the document is provided in a graphical file format.

12. A data extraction system as recited in claim 10, wherein the image of the document is provided in a graphical file format.

13. A data extraction system as recited in claim 12, wherein the object block is a key-value block.

14. A data extraction system as recited in claim 10, wherein a user input is provided to the character level neural network model, and wherein the character level neural network model predicts a key type and a value for the object block based at least in part on the user input.

15. A data extraction system as recited in claim 10, wherein a user input is provided to the pattern matching model, and wherein the pattern matching model predicts a key type and a value for the object block based at least in part on the user input.

16. A data extraction system as recited in claim 10 for extracting data from an image of a document, the data extraction system comprising:
   a character level neural network model that receives an object block and recognized text within at least a portion of the document as recognized from the image of the document, the character level neural network model predicting a key type and a value for the object block; and
   a pattern matching model that receives an object block and recognized text within at least a portion of the document as recognized from the image of the document, the pattern matching model predicting a key type and a value for the object block,
   wherein key type and value predicted using the character level neural network model are accepted and recorded if such prediction is successful,
   wherein key type and value predicted using the pattern matching model are accepted and recorded if prediction using the character level neural network model is unsuccessful, and
   wherein the data extraction system receives or seeks user input to assist with extraction of key type and value if prediction using the character level neural network model is unsuccessful and if prediction using the pattern matching model is unsuccessful.

17. A non-transitory computer readable medium including at least computer program code for extracting data from an image of a document, the computer readable medium comprising:
   computer program code for retrieving object data pertaining to an object that has been detected in the image of the document, the object data denoting at least a portion of the document having the object;
   computer program code for acquiring text pertaining to the portion of the document having the object, the text having been recognized from the image of the document;
   computer program code for determining a key type for the object based on at least the text;
   computer program code for determining a value for the object based on the determined key type for the object; and
   computer program code for storing the determined key type and the determined value for the object,
   wherein the computer program code for determining a key type for the object is based on at least a machine learned model, the machine learned model pertaining to at least a character level neural network model,
   wherein the determining of the key type predicts the key type using the character level neural network model, and provides a confidence indication for key type predicted using the character level neural network model,
   wherein the key type is predicted using the character level neural network model is accepted and recorded if the confidence indication is greater than a threshold level, and wherein the determining of the key type predicts the key type using the pattern matching model is predicted and recorded if the confidence indication associated with prediction using the character level neural network model is not greater that the threshold level.

18. A non-transitory computer readable medium as recited in claim 17, wherein the text is recognized through Optical Character Resolution (OCR) of at least a portion of the document.

19. A non-transitory computer readable medium as recited in claim 17, wherein the object is an object block, and the object data is provided within the object block.

20. A non-transitory computer readable medium as recited in claim 17, wherein the object is a key-value block.

21. A non-transitory computer readable medium as recited in claim 17, wherein the key type comprises a textual descriptor.

22. A non-transitory computer readable medium as recited in claim 17, wherein the document comprises a business transaction document, and wherein the image of the document is provided in a graphical file format.

23. A non-transitory computer readable medium as recited in claim 17, wherein the machine learned model is a Natural Language Processing (NLP) model, and wherein the character level neural network model having at least a Character-level Convolutional Network and a Bidirectional Gated Recurrent Units Network.

24. A non-transitory computer readable medium as recited in claim 22, wherein the text is recognized through Optical Character Resolution (OCR) of at least a portion of the document.

25. A non-transitory computer readable medium as recited in claim 24, wherein the object is an object block, and the object data is provided within the object block.

26. A non-transitory computer readable medium as recited in claim 25, wherein the document comprises a business transaction document, and wherein the image of the document is provided in a graphical file format.

* * * * *